US008568878B2

(12) United States Patent
Wilson et al.

(10) Patent No.: US 8,568,878 B2
(45) Date of Patent: Oct. 29, 2013

(54) DIRECTLY FABRICATED NANOPARTICLES FOR RAMAN SCATTERING

(75) Inventors: Robert J. Wilson, Campbell, CA (US); Jung-Sub Wi, Tsukuba (JP); Shan X. Wang, Portola Valley, CA (US); Edward S. Barnard, Redwood City, CA (US); Mark L. Brongersma, Menlo Park, CA (US); Mary Tang, San Francisco, CA (US)

(73) Assignee: The Board of Trustees of the Leland Stanford Junior University, Palo Alto, CA (US)

( * ) Notice: Subject to any disclaimer, the term of this patent is extended or adjusted under 35 U.S.C. 154(b) by 117 days.

(21) Appl. No.: 13/066,248

(22) Filed: Apr. 8, 2011

(65) Prior Publication Data

US 2011/0250464 A1    Oct. 13, 2011

Related U.S. Application Data

(60) Provisional application No. 61/341,991, filed on Apr. 8, 2010.

(51) Int. Cl.
*B22F 1/00* (2006.01)
*G01N 21/65* (2006.01)

(52) U.S. Cl.
USPC ............................ 428/402; 428/405; 356/301

(58) Field of Classification Search
None
See application file for complete search history.

(56) References Cited

U.S. PATENT DOCUMENTS 7,393,692 B2 *   7/2008   Farquharson et al.   ........ 436/171
2009/0294692 A1   12/2009   Bourke, Jr. et al.

FOREIGN PATENT DOCUMENTS

WO    WO 2006099494 A2 *   9/2006

OTHER PUBLICATIONS

Dhawan et al. (Focuses ion beam fabrication of metallic nanostructures on end faces of optical fibers for chemical sensing applications, J. Vac. Sci. Technol. B 26, 2168, 2008).*
Oates et al. (Combinatorial Surface-Enhanced Raman Spectroscopy and Spectroscopic Ellipsometry of Silver Island Films, J. Phys. Chem. C 2009, 113, 4820-4828).*

* cited by examiner

*Primary Examiner* — Mark Ruthkosky
*Assistant Examiner* — Alexandre Ferre
(74) *Attorney, Agent, or Firm* — Lumen Patent Firm

(57) ABSTRACT

A Raman-active nanoparticle is provided that includes a dish-shape plasmonically active metal base, and a plasmonically active metal pillar disposed on the plasmonically active metal base, where the plasmonically active metal pillar is disposed within the dish-shape plasmonically active metal base and normal to a bottom of the dish-shape plasmonically active metal base, where a circular gap is disposed between the dish-shape plasmonically active metal pillar and inner walls of the dish-shape plasmonically active metal base. In one embodiment a Raman-active nanoparticle is provided that includes a dish-shape base having a dielectric material, an electrically conductive layer disposed on the inner surface of the dish-shape base, and an electrically conductive pillar disposed on the conductive layer, and within the dish-shape and perpendicular to a bottom of the dish-shape base, where a circular gap is disposed between the conductive pillar and inner walls of the dish-shape base.

19 Claims, 21 Drawing Sheets

(a)

(b)

(a)

(b)

DIRECTLY FABRICATED NANOPARTICLES FOR RAMAN SCATTERING

CROSS-REFERENCE TO RELATED APPLICATIONS

This application claims priority from U.S. Provisional Patent Application 61/341,991 filed Apr. 8, 2010, which is incorporated herein by reference.

STATEMENT OF GOVERNMENT SPONSORED SUPPORT

This invention was made with Government support under contract 1U54CA119367 awarded by National Cancer Institute. The Government has certain rights in this invention.

FIELD OF THE INVENTION

The invention relates to surface enhanced Raman scattering (SERS). More particularly, the invention relates to devices for generating 'Raman hot spots' for amplifying the inherently small cross-section of Raman scattering.

BACKGROUND OF THE INVENTION

Electromagnetic field enhancement from a localized surface plasmon resonance is the major basis for surface enhanced Raman scattering (SERS), which has attracted much scientific and engineering interest because of potential use in highly sensitive, real time, non-destructive, and multiplexing molecular detection. One vital prerequisite for SERS-based molecular detection is to reliably generate 'Raman hot spots' for amplifying the inherently small cross-section of Raman scattering. Since the first demonstration of single molecule detection, the salt or evaporation induced aggregation of colloidal Au or Ag nanoparticles in liquids or the Langmuir-Blodgett assembly of nanoparticles on substrates have been widely used as convenient methods for creating Raman hot spots. These bottom-up routes, however, are usually accompanied by loss of reproducibility and yield. For example, recent analysis of the distribution of SERS enhancement from Ag thin films deposited on self-assembled nanoparticles shows the hottest sites (enhancement factor$>10^9$) account for only 0.006% of the total. Extensive studies on lithographically patterned plasmonic nanostructures have also been done in order to generate more uniform and reproducible hot spots, however, these structures also have critical issues. Typically, the patterned nanoscale gap structures, such as plasmonically coupled nano-rods, disks, or prisms, cannot maintain their well-controlled gap distance when they are released from the substrate. This limits their use for biomedical applications of SERS-based in-vitro or in-vivo imaging.

What is needed are nanoparticles, and a method of fabricating nanoparticles, designed to produce strong electromagnetic field enhancements near spatially sharp features of each nanoparticle through the use plasmonic metals and rationally fabricated nano-shapes. These synthetic nanoparticles are formed by direct-fabrication by top-down physical routes, in which materials are deposited in a nano-patterned polymer template, allowing for exquisite control over material composition, multilayer structure, particle size, and shape which are hardly achievable with chemical nanoparticle synthesis.

SUMMARY OF THE INVENTION

To address the needs in the art, a Raman-active nanoparticle is provided that includes a dish-shape plasmonically active metal base, and a plasmonically active metal pillar disposed on the plasmonically active metal base, where the plasmonically active metal pillar is disposed within the dish-shape plasmonically active metal base and perpendicular to a bottom of the dish-shape plasmonically active metal base, where a circular gap is disposed between the dish-shape plasmonically active metal pillar and inner walls of the dish-shape plasmonically active metal base.

According to one aspect of the invention, the dish-shape plasmonically active metal base can be a material that can include Ag, Au, Pt, Cu, and/or Al. In one aspect the dish-shape plasmonically active metal base includes layered laminates and alloys.

In another aspect of the invention, the plasmonically active metal pillar can be material that includes Ag, Au, Pt, Cu, and/or Al. In one aspect, the plasmonically active metal pillar includes layered laminates and alloys.

In a further aspect of the invention, the circular gap has a dimension in a range of 1 nm to 100 nm.

According to another aspect of the invention, the dish-shape plasmonically active metal base is disposed on a dish-shape dielectric material. In one aspect the dish-shape dielectric material can be a material that includes $SiO_2$, $Al_2O_3$, MgO, silicon nitride, titanium nitride, and/or indium tin oxide. Here, the dish-shape dielectric material can have an outer diameter in a range of 10 nm to 1000 nm. Further, the dish-shape dielectric material can have a wall thickness in a range of 1 nm to 100 nm. In another aspect, the dish-shape dielectric material has a bottom thickness in a range of 1 nm to 100 nm. In another aspect, the dish-shape dielectric material has a height in a range of 2 nm to 100 nm.

According to another aspect of the invention, the dish-shape plasmonically active metal base has a thickness in a range of 1 nm to 100 nm.

In yet a further aspect of the invention, the plasmonically active metal pillar has a diameter in a range of 1 nm to 999 nm.

According to another aspect of the invention, the plasmonically active metal pillar has a height in a range of 1 nm to 200 nm.

According to one aspect of the invention, the Raman-active nanoparticle is formed using nanoimprint lithography and thin-film deposition.

In a further aspect of the invention, the Raman-active nanoparticle is formed by forming a mold for a dish-shape base, where the mold includes a circular cavity having an circular opening, where the circular opening is smaller than the circular cavity, depositing a layer of the dielectric material to the dish-shape base mold, using a deposition apparatus, where the dish-shape base mold is mounted at an angle with respect to a deposition direction of the dielectric material, where the dish-shape base mold is rotated and the dish-shape base is formed, or depositing a layer of the dielectric material to the dish-shape base mold, using a diffuse deposition apparatus, where the dish-shape base mold is stationary and the dish-shape base is formed. Further, Raman-active nanoparticles are formed by depositing the dish-shape plasmonically active metal base and the plasmonically active metal pillar, using the deposition apparatus, where the dish-shape base mold is mounted at a perpendicular angle with respect to a deposition direction of the plasmonically active metal material, and releasing the Raman-active nanoparticle from the mold. According to the invention, the deposition apparatus can include ion beam deposition, physical vapor deposition, chemical vapor deposition, evaporation, electrochemical plating, or other solution chemistry. Further, the mold can be formed using a patterning method, where the patterning method can include nanoprint lithography, optical lithography, e-beam lithography, nanosphere lithography using self-assembled nanoparticle etch masks, or various embossing or injection methods.

According to another aspect of the invention, the nanoparticle can include at least one magnetic layer.

In a further aspect of the invention, the nanoparticle includes at least one magnetic coating.

In yet another aspect of the invention, the Raman-active nanoparticle includes an array of the Raman-active nanoparticles on a substrate.

In another aspect of the invention, the dielectric material can include a material having a complex index of refraction (n+ik), where k has a value in a range between 0.0 and 0.5.

DETAILED DESCRIPTION

Figure 1:
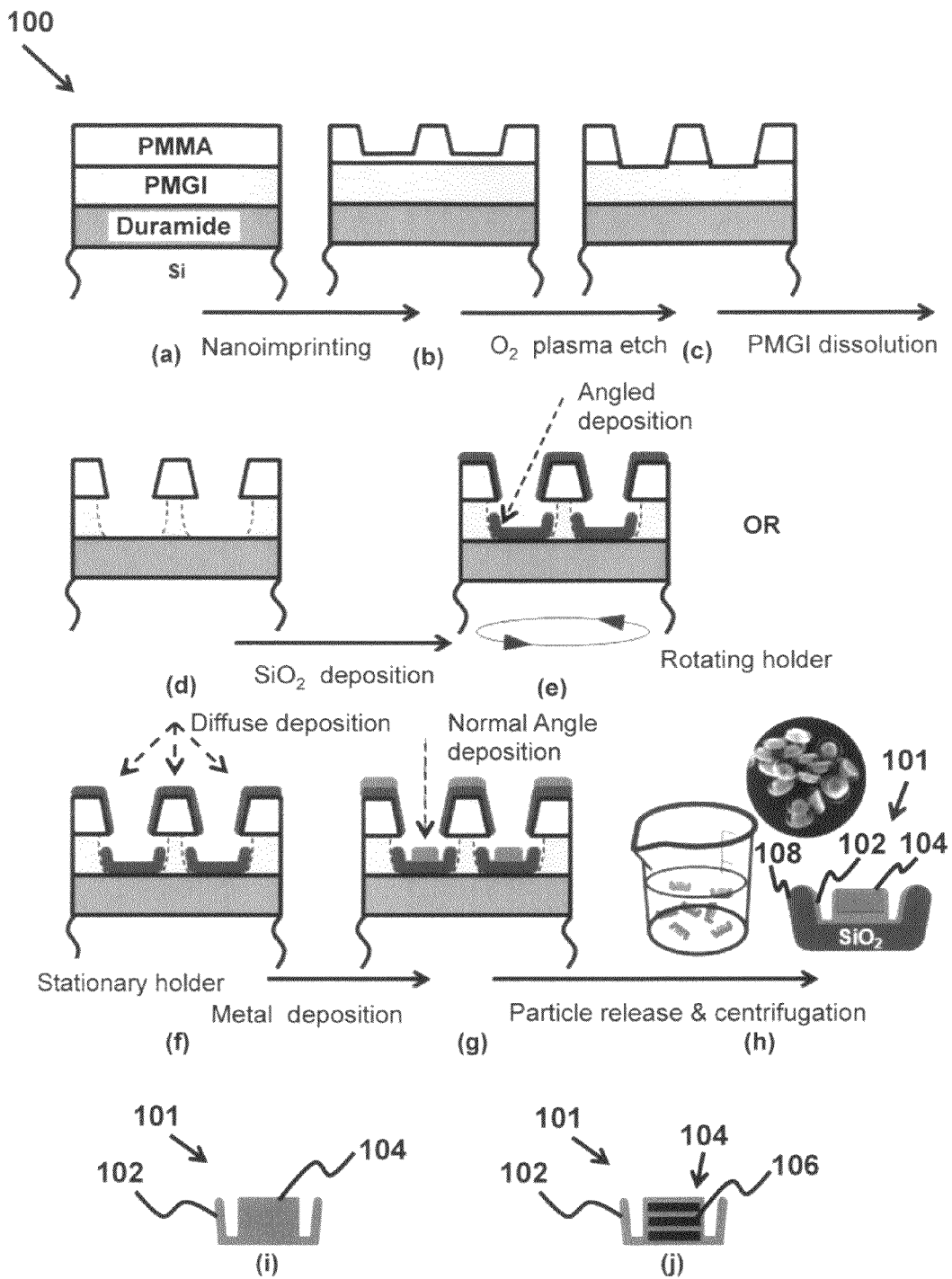
FIGS. 1a-1j show a schematic view of the process of forming Raman-active nanoparticles, according to one embodiment of the invention.

The current invention provides a method of direct-fabrication of synthetic nanoparticles by top-down physical routes, in which materials are deposited in a nano-patterned polymer template, which enables exquisite control over material composition, multilayer structure, particle size, and shape. The current invention is not achievable with chemical nanoparticle synthesis. The wide freedom of nanostructure design from various lithographic and deposition techniques enables engineering of unique physical properties of custom designed nanoparticles, such as magnetostatically coupled synthetic antiferromagnetic nanoparticles and sub-lithographic-feature enhanced plasmonic nanoparticles described in this report. These nanoparticles are designed to produce strong electromagnetic field enhancements near spatially sharp features of each nanoparticle through the use plasmonic metals and rationally fabricated nano-shapes.

The invention provides a top-down synthesis of monodisperse plasmonic nanoparticles containing rationally designed Raman hot spots. The Raman-active nanoparticles, according to one embodiment of the current invention, are fabricated using nanoimprint lithography and thin-film deposition and include novel substructures with sub-lithographic dimensions: a disk-shaped Ag core; a Petri dish-shaped $SiO_2$ base whose inner surface is coated with Ag film, and a sub-10 nm scale circular gap between the core and the base. Confocal Raman measurements and electromagnetic simulations imply that Raman hot spots appear at the inside perimeter of individual nanoparticles and serve as the source of a 1000 fold increase of SERS enhancement factors that enables single molecule sensitivity. A multi-modality version of these nanoparticles, which includes the functionality offered by magnetic multilayers, is demonstrated. These results show the potential of direct fabrication for creating exotic monodisperse nanoparticles, which combine engineered internal nanostructures and multi-layer composite materials, for use in nanoparticle-based molecular imaging and detection.

Direct fabrication using cost-effective nanoimprint lithography (NIL) and thin film deposition provides very uniform SERS-active nanoparticles whose dimensions and shapes can be precisely designed to incorporate internal Raman hot spots for more sensitive and reproducible response. Example results are provided where single molecules of Rhodamine 6G (R6G), as discerned from their low molecular coverage and blinking behavior, were detected on isolated individual nanoparticles without the aid of nanoparticle aggregation. Raman hot spots just inside the perimeter of individual nanoparticles make it possible to detect these single molecules, as verified by direct observation using confocal Raman microscopy and by numerical electromagnetic simulations.

An example process for synthesizing these Raman-active nanoparticles is shown in FIGS. 1a-1j and includes steps for NIL, $O_2$ plasma etching of the residual imprinting resist layer (PMMA), wet chemical development of an undercut resist layer (PMGI), sequential vacuum deposition of $SiO_2$ and Ag, and final release of nanoparticles. As shown in FIGS. 1a-1d, NIL is used to define the diameter of the nanoparticles by indenting a thermoplastic PMMA layer, with NIL offering distinct benefits of nanoscale resolution, uniform and reliable pattern generation, and high throughput. Also, by adjusting the NIL mold pillar diameters, it is possible to match the nanoparticle diameter to dimensional resonances for excitation wavelengths varying from UV to near-IR. After stamp release and resist processing, FIG. 1e shows $SiO_2$ being ion beam deposited with a measured thickness of 15 nm over the whole $SiO_2$ base. FIG. 1e shows the sample is mounted at an oblique angle with respect to the $SiO_2$ target, and rotated during the deposition. Due to the angled incidence of the $SiO_2$ flux and surface diffusion of deposited material towards the undercut cavity walls, both the bottom surface and the lower sidewalls of PMGI wells are found to be covered conformally by the $SiO_2$ layer. Alternatively FIG. 1f shows the layer of the dielectric material is deposited on the dish-shape base mold using a diffuse deposition apparatus, where the dish-shape base mold is stationary and the dish-shape base is formed. For the steps up to and including the dielectric base, a 50 nm thick pre-imidized polyimide polymer was first spin-coated on Si (100) substrate and baked on a hot plate at 300° C. for 10 min. Next, a 90 nm thick layer of polymethylglutarimide (PMGI) was spin-coated onto the Durimide, and baked at 200° C. for 5 min. Finally, a 160 nm thick polymethyl methacrylate (PMMA) resist was spin-coated onto the PMGI and baked at 140° C. for 5 min. For many samples that were not released as synthesized nanoparticles, but did function as nanoparticle arrays, only the PMMA/PMGI bi-layer resist stack on a Si substrate was used. After preparing the resist stack, the coated wafers were subjected to thermal nanoimprinting at 180° C. under a pressure of 40 bar for 60 s, using a nanoimprint tool. A laboratory-made 2×2 inch$^2$ Si mold that includes an array of nanopillars, with 130 nm diameters and 150 nm heights, was used. After separation of the mold from the wafer surface, the residual PMMA layer was etched by $O_2$ plasma and the sample was then immersed in a wet-chemical developer, for 5 sec, to form an undercut profile in the PMGI resist and to form flat bottomed template pores. Next, $SiO_2$ was deposited, using 1 keV Xe ion beam deposition at a pressure of $2.5×10^{-4}$ Torr. The sample was continuously rotated at an oblique angle, with respect to the $SiO_2$ target, during deposition.

After completing the steps for dielectric base formation, a 1 nm Ta adhesion layer followed by a 50 nm Ag layer were deposited using 1 keV Xe ion beam deposition. After lift-off in acetone with sonication and removal of PMGI in LDD-26W, the synthesized Raman-active nanoparticle arrays on Si substrates were examined by scanning electron microscopy (SEM). For suspended nanoparticles, the Durimide release layer was dissolved. The nanoparticles were then collected by multiple cycles of centrifugation (at about ten thousand g), solvent exchange, and re-suspension in water.

Figure 5:
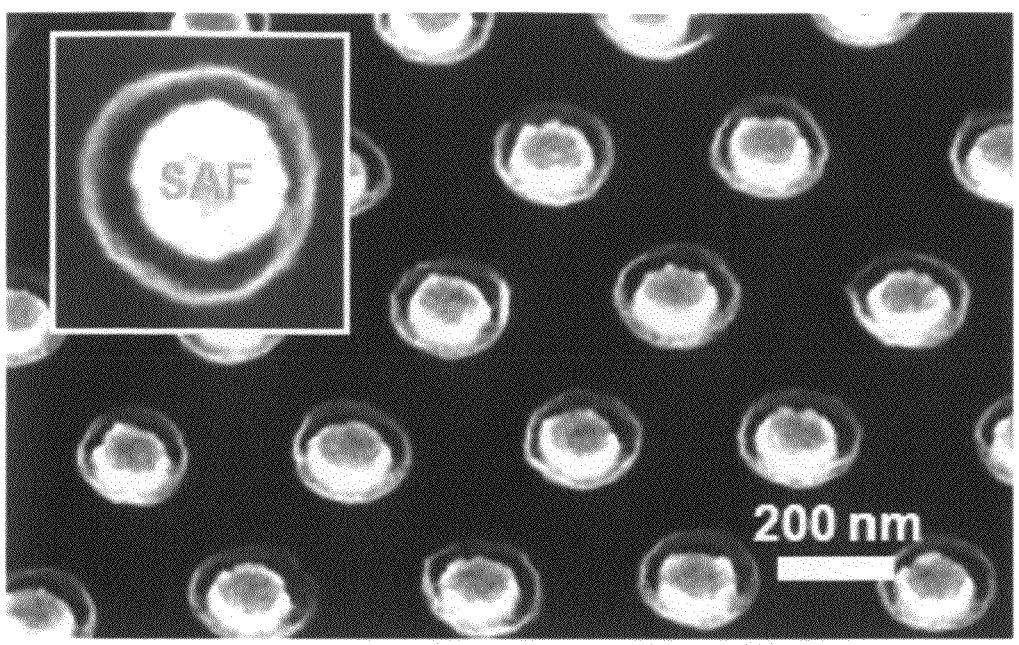
FIGS. 5a-5c show SEM images of magneto-Raman multifunctional nanoparticles and a hysteresis loop of substrate-bound nanoparticles, according to some embodiments of the invention.
Figure 5:
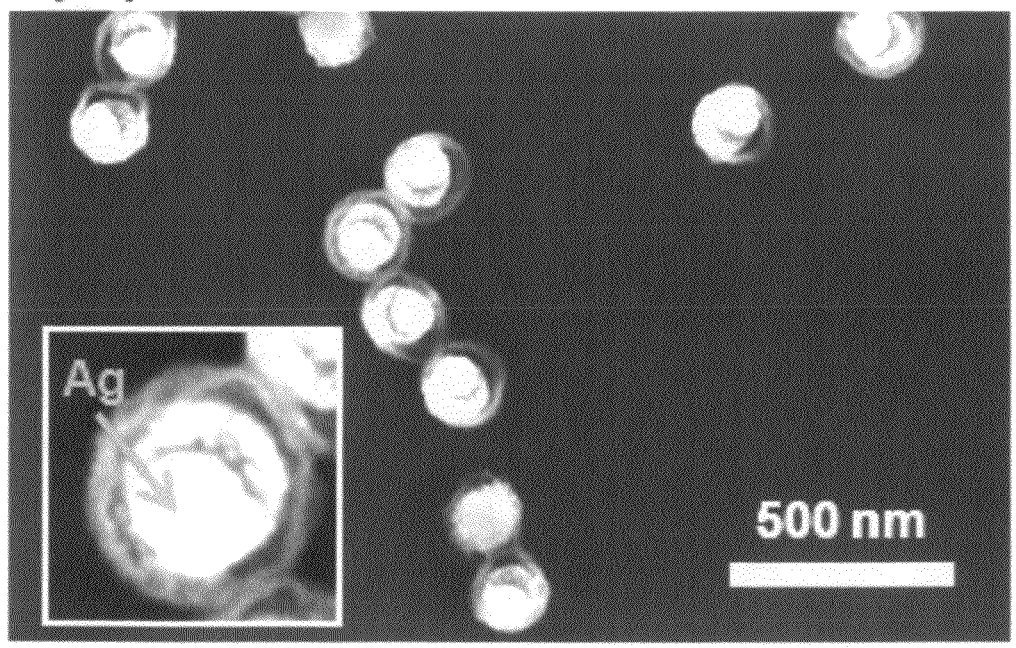
Figure 5:
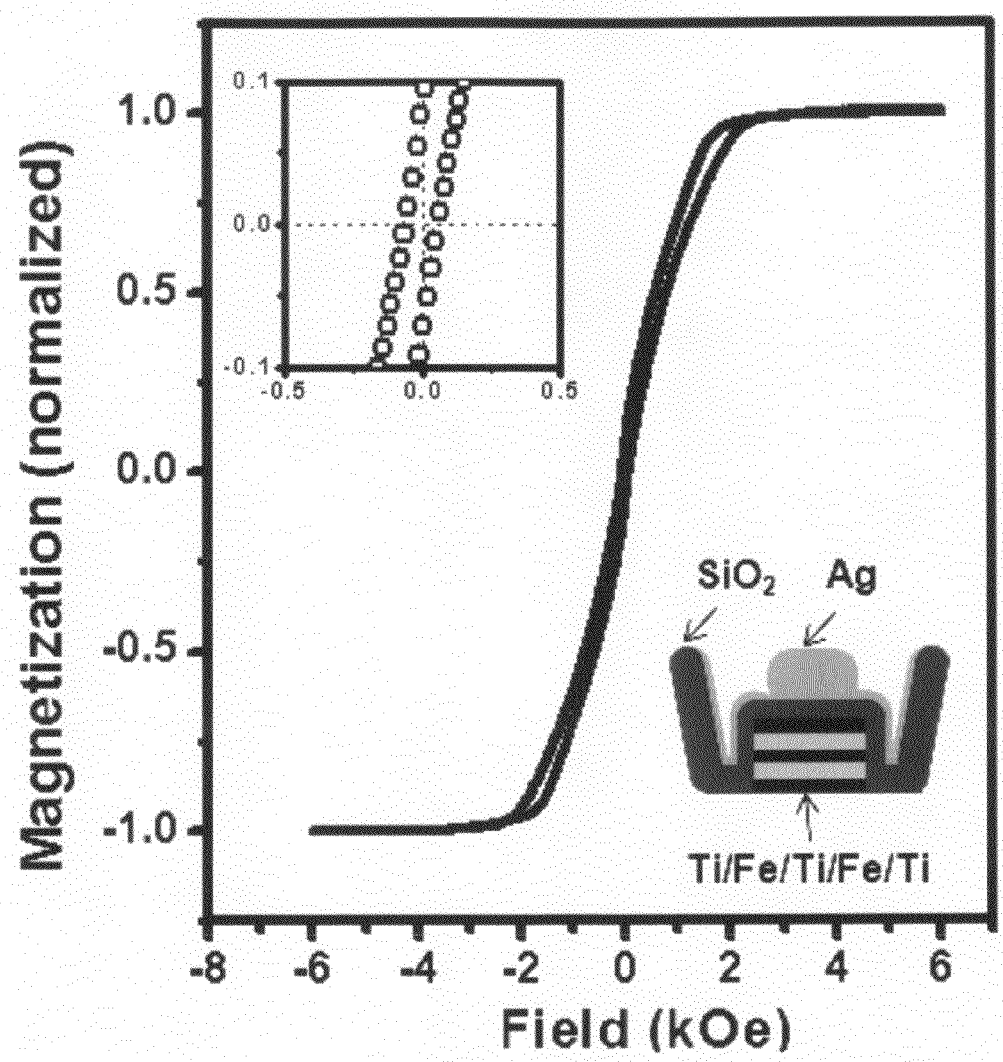

FIG. 1$i$ shows one embodiment of the invention that includes a nanoparticle 101 having a dish-shape plasmonically active metal base 102, and a plasmonically active metal pillar 104 disposed on the plasmonically active metal base 102, where the plasmonically active metal pillar 104 is disposed within the dish-shape plasmonically active metal base 102 and normal to a bottom of the dish-shape plasmonically active metal base 102, where a circular gap is disposed between the plasmonically active pillar 104 and inner walls of the dish-shape plasmonically active metal base. FIG. 1$j$ shows a further embodiment of the invention that includes a nanoparticle 101 having a the plasmonically active pillar 104 with at least one magnetic layer 106, and the nanoparticle 101 can include at least one magnetic coating. FIGS. 5$a$-5$b$ show SEM images and FIGS. 5$c$-5$d$ show magnetic hysteresis loops and a diagram of the layered and shaped structure of an exemplary magnetically augmented sombrero nanoparticle.

The dish-shape plasmonically active metal base 102 and the plasmonically active metal pillar 104 can include Ag, Au, Pt, Cu, and/or Al. In one aspect the dish-shape plasmonically active metal base 102 and the plasmonically active metal pillar 104 include layered laminates and alloys. The circular gap can have a dimension in a range of 1 nm to 100 nm, the dish-shape plasmonically active metal base 102 can have a thickness in a range of 1 nm to 100 nm, and the plasmonically active metal pillar 104 can have a diameter in a range of 1 nm to 999 nm, with the plasmonically active metal pillar 104 having a height in a range of 1 nm to 200 nm.

Referring now to FIG. 1$h$, shown is one aspect of the invention where the nanoparticle 101 includes a dish-shape dielectric material 108 that can be a material such as $SiO_2$, $Al_2O_3$, MgO, silicon nitride, titanium nitride, and/or indium tin oxide. Here, the dish-shape dielectric material 108 can have an outer diameter in a range of 10 nm to 1000 nm. Further, the dish-shape dielectric material 108 can have a wall thickness in a range of 1 nm to 100 nm. In another aspect, the dish-shape dielectric material 108 has a bottom thickness in a range of 1 nm to 100 nm. In another aspect, the dish-shape dielectric material 108 has a height in a range of 2 nm to 100 nm.

According to the invention, the deposition apparatus can include ion beam deposition, physical vapor deposition, chemical vapor deposition, thermal evaporation, electrochemical plating, or solution chemistry. Further, the mold can be formed using a patterning method, where the patterning method can include nanoprint lithography, optical lithography, e-beam lithography, nanosphere lithography using self-assembled nanoparticle etch masks, embossing, or injection molding.

In yet another aspect of the invention, the Raman-active nanoparticle includes an array of the Raman-active nanoparticles on a substrate.

In another aspect of the invention, the dielectric material can include a material having a complex index of refraction (n+ik), where k has a value in a range between 0.0 and 0.5.

Figure 2:
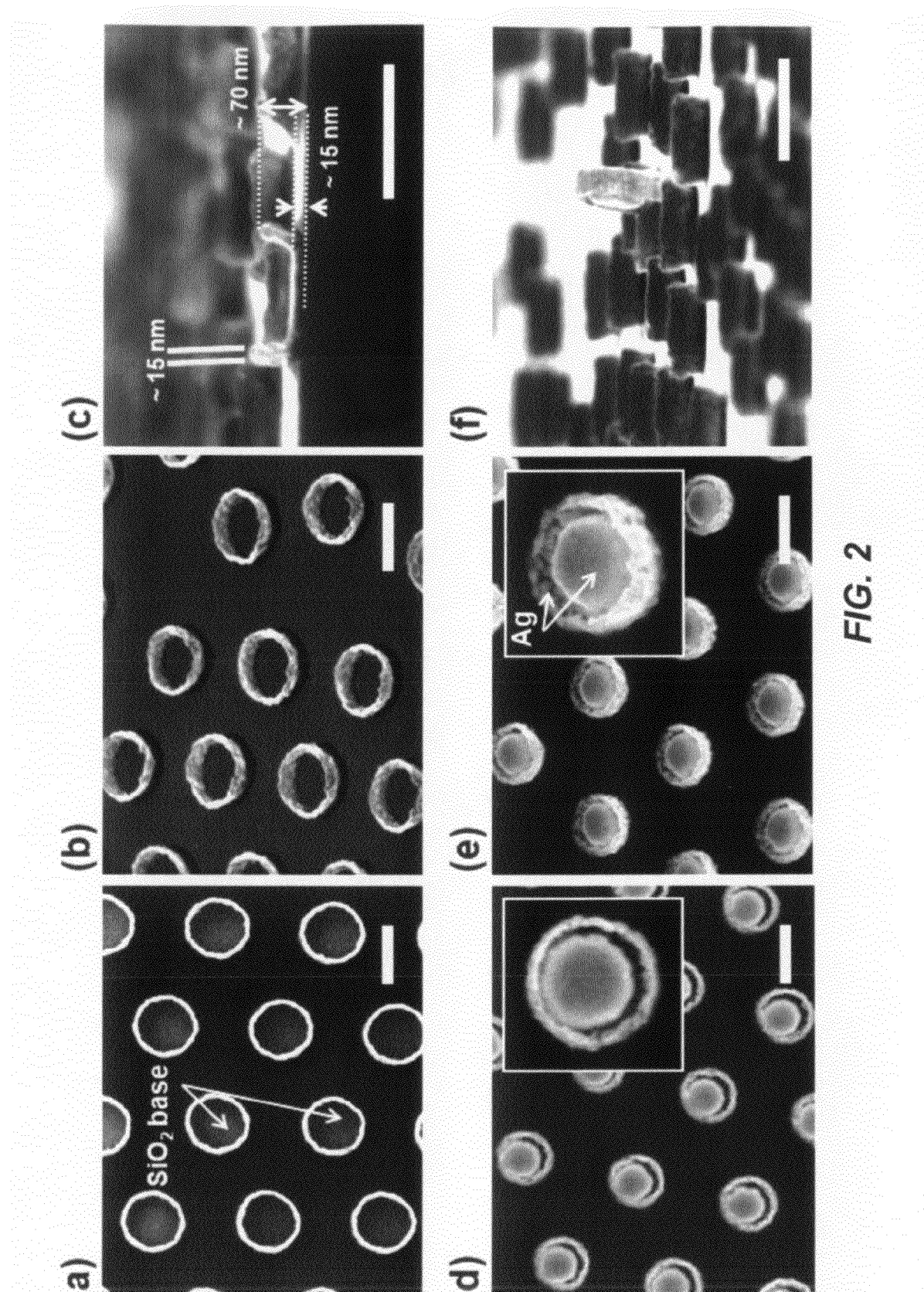
FIGS. 2a-2f show SEM images of physically synthesized Raman-active nanoparticles at various fabrication steps, according to some embodiments of the invention.
Figure 6:
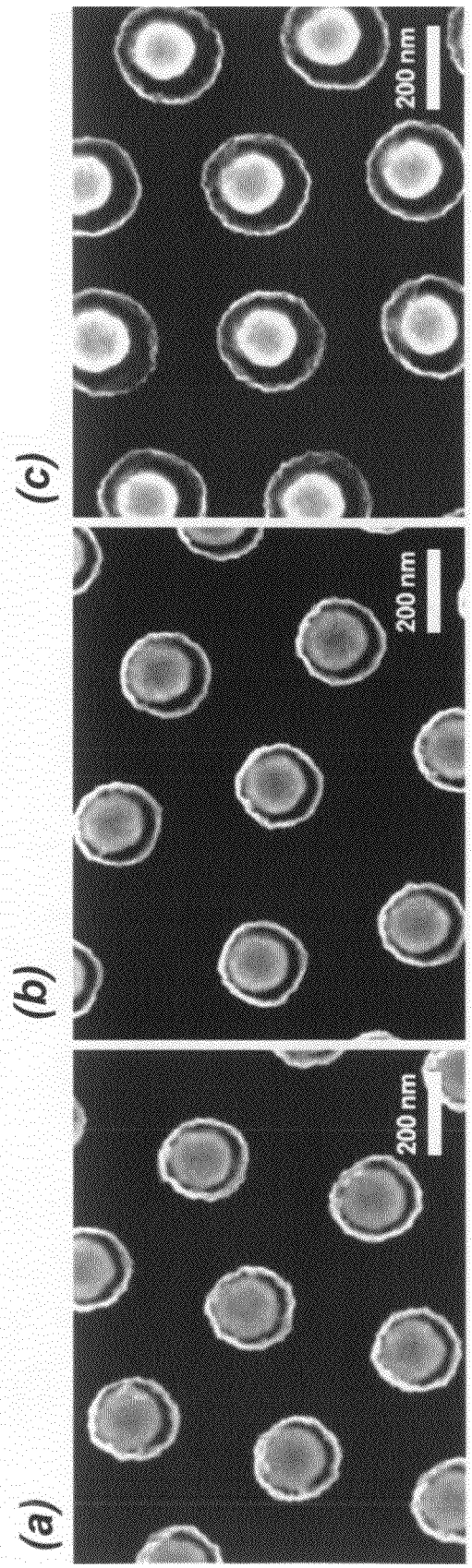
FIGS. 6a-6c show SEM images of Raman sombrero nanoparticle arrays generated using different development times for the PMGI undercut layer, according to some embodiments of the invention.

FIGS. 2$a$-2$c$ show scanning electron microscopy (SEM) images of $SiO_2$ dielectric bases with uniform shapes and sizes that were rigid enough to be successfully generated and observed following removal of PMMA and PMGI resists. Next, a 1 nm thick Ta layer was ion beam deposited at normal incidence (perpendicular incidence) on the $SiO_2$ base, to promote adhesion of a subsequently deposited 50 nm thick Ag film. SEM images in FIGS. 2$d$-2$f$ show the fabricated Raman-active nanoparticles after the patterning resists are stripped. Because most of the arriving Ag flux, which is all ejected from a Ag target by a 1 keV Xe$^+$ beam, passes through the patterned PMMA layer at near normal angle of incidence, a disk-like Ag core of almost the same diameter as the NIL mold forms at the center of the $SiO_2$ base. The dimensions of each Ag core, 110 nm diameter and 50 nm height, were chosen for efficient extinction of a 532 nm excitation laser. In addition to depositing at a normal angle of incidence on the exposed substrate area, some Ag atoms scatter off Xe atoms ($2×10^{-4}$ Torr ambient) in transit and are non-normally incident. Furthermore, these energetic arriving atoms diffuse laterally on the growing film before equilibrating, so both vapor phase scattering and surface diffusion mechanisms contribute to deposition on the interior sidewalls of the $SiO_2$ bases, simultaneously with the formation of Ag cores. Deposition methods, including some which avoid metallization of sidewalls, will be described later. The tilted-view SEM image in FIG. 2$e$ shows the granular Ag films that cover the inside of these $SiO_2$ sidewalls. The off-center appearance of the Ag core in the $SiO_2$ base occurs due to a built-in misorientation between our sample holder and Ag target, leading to an average non-normal angle of incidence in our deposition chamber. According to one embodiment, the off-center appearance provides a continuous variation of the size of the gap between Ag core and thin. Ag sidewall film from ~0-10 nm, as is evident in FIG. 2$d$ and its inset, and shows that the minimum gap size can be controlled in the sub-10 nm range by adjusting the Ag deposition angle and including sample rotation during deposition, or in the range well above 10 nm by increasing the PMGI undercut. FIGS. 6$a$-6$c$ show SEM images of Raman sombrero nanoparticle arrays generated using different development times for the PMGI undercut layer. The samples were immersed in a commercial wet-chemical developer for (6$a$) 3 sec, (6$b$) 5 sec, and (6$c$) 10 sec to form undercut profiles in the PMGI resist. The variation in undercut with etch time clearly allows control of the outer diameter of the dish shape base. Based on their unique shape, these fabricated nanoparticles are herein referred to as Raman sombreros.

Example SERS measurements are provided, which were carried out using Raman sombrero arrays treated with concentrations of R6G ranging from $10^{-4}$ M to $10^{-9}$ M. A 2 µL droplet of R6G methanol solution was spread uniformly on each 3×3 mm² sample and dried on a hot plate at 90° C. Due to the low surface tension (~23 dyne/cm) and rapid evaporation of methanol, the R6G solution dried quite uniformly over the whole sample surface. Afterwards, SERS measurements were carried out using a confocal Raman microscope (alpha500, WITec). R6G treated sample surfaces were mapped over 25 µm wide square frames, with a unit pixel mesh of 250 nm×250 nm and an accumulation time of 0.036 sec/pixel. To avoid photochemical damage, the power of the 532 nm excitation laser was adjusted to 1.4 mW for mapping SERS signals and to 0.6 mW for measuring temporal changes of SERS signals. The power of the excitation laser was measured without objective aperture and lens, because of the limited space between objective lens and specimen stage.

Figure 3:
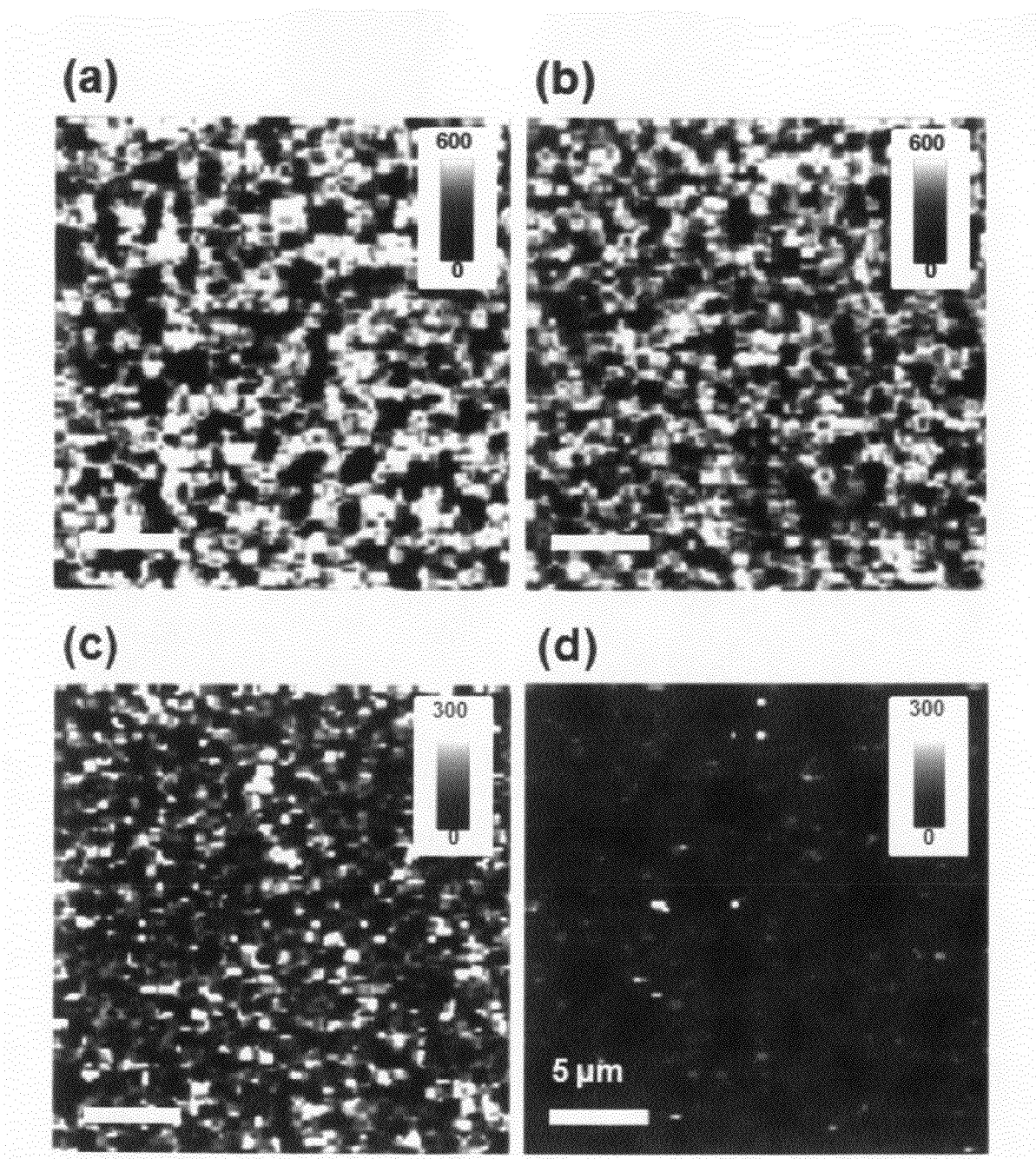
FIGS. 3a-3h show SERS characteristics of the Raman sombrero nanoparticles, according to some embodiments of the invention.
Figure 3:
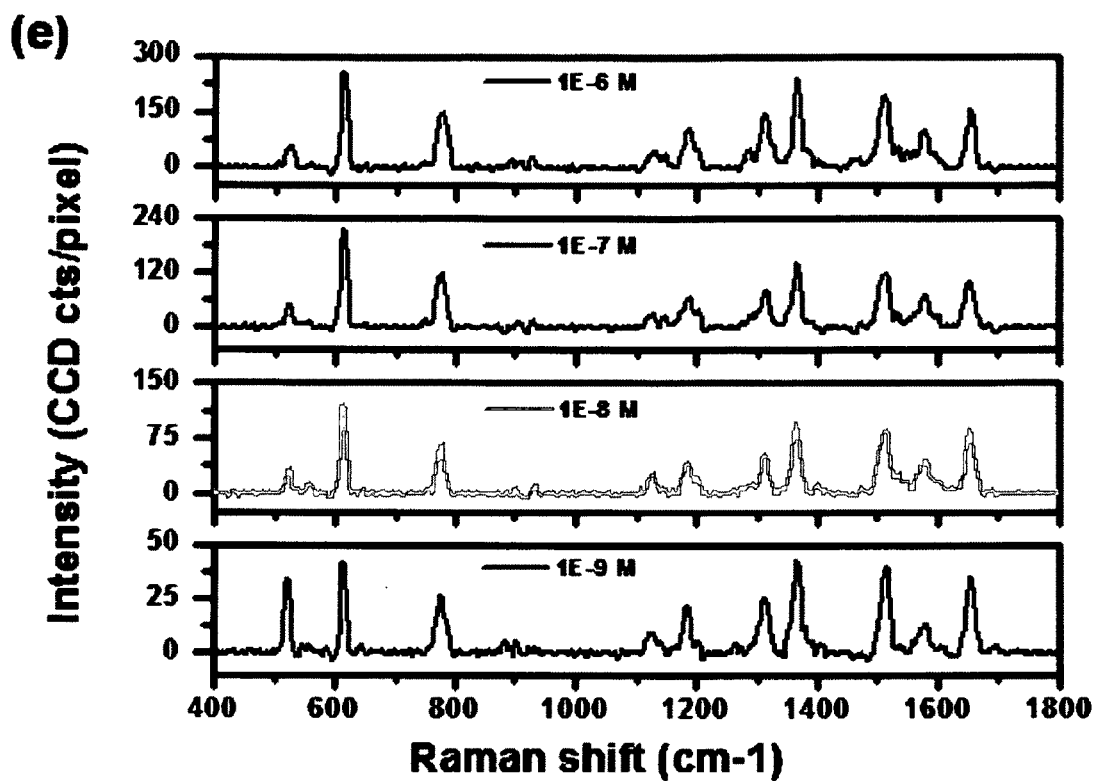
Figure 3:
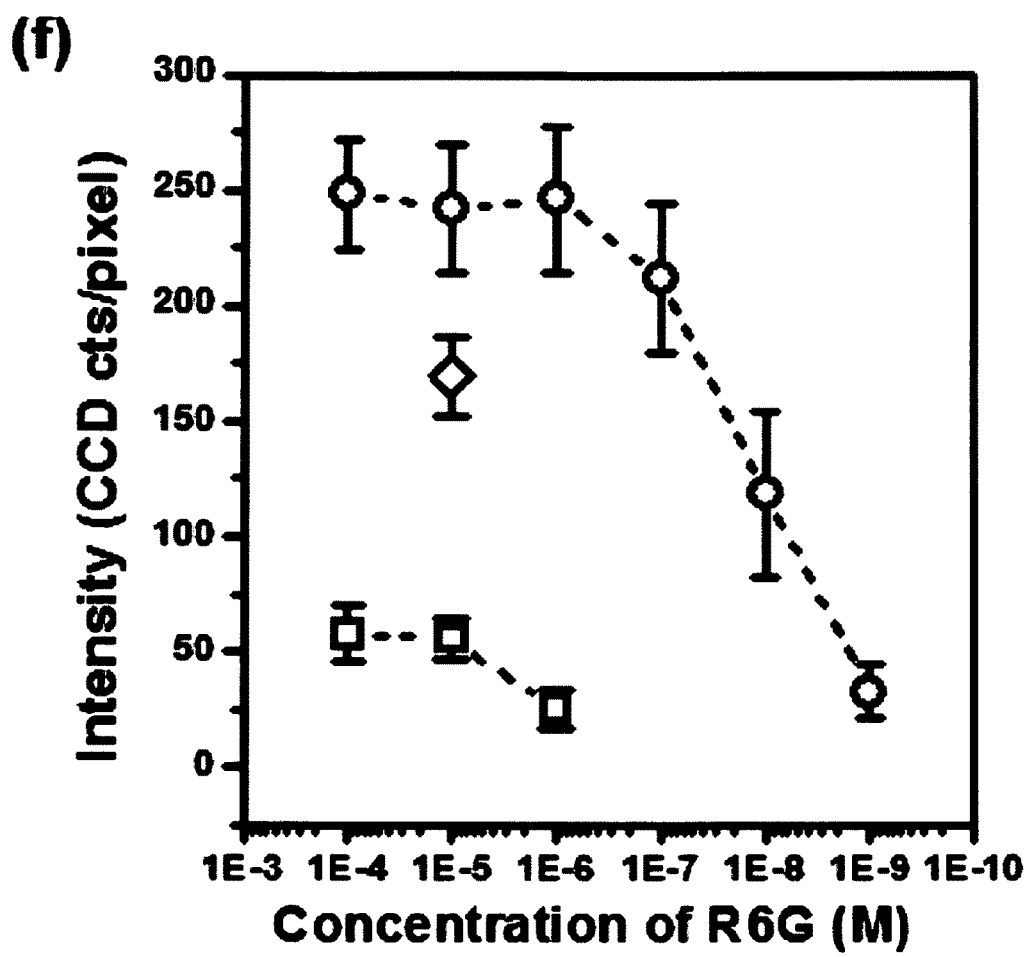
Figure 3:
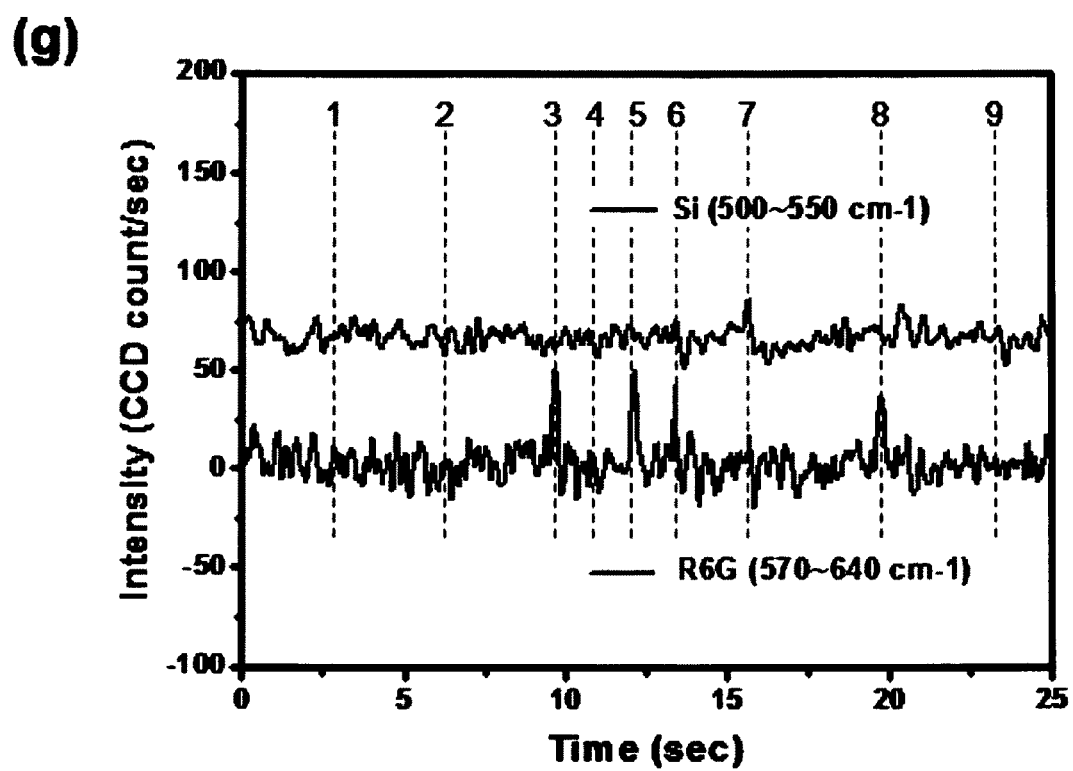
Figure 3:
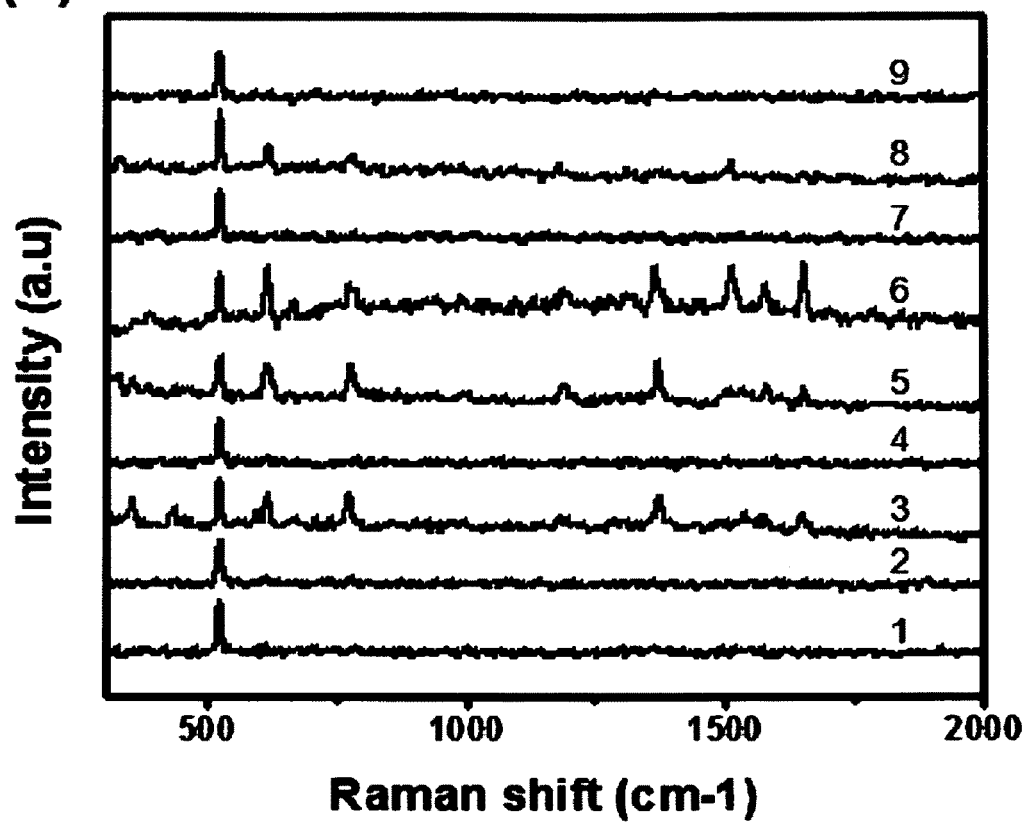

Because the nanoparticle pitch is about 400 nm, which is larger than the size of each pixel (250 nm square) and the calculated confocal spot diameter of 240 nm (≈0.4·λ/NA, with NA=numerical aperture=0.9), it was assumed that the SERS signal for each pixel was typically generated by a single nanoparticle. SERS maps in FIGS. 3a-3d show the spatial distribution of the Raman intensity, integrated over frequency shifts between 590 and 640 cm$^{-1}$, which originates from an in-plane bending of the xanthene ring in the R6G molecule. FIG. 3e shows representative spectra from four different concentrations of R6G coating solutions. Peak positions in these spectra were precisely assigned to the reported vibrational bands of R6G molecules. Intensities of every peak increased with the concentration of R6G and eventually saturated above $10^{-6}$ M, except for the leftmost (520 cm$^{-1}$) peak from the Si substrate. The intensity change with R6G concentration is summarized in FIG. 3f. For plotting this data, 1000 pixels were selected from each SERS map to exclude bare Si regions, and were averaged for the Raman peak with shift of 615 cm$^{-1}$.

Figure 7:
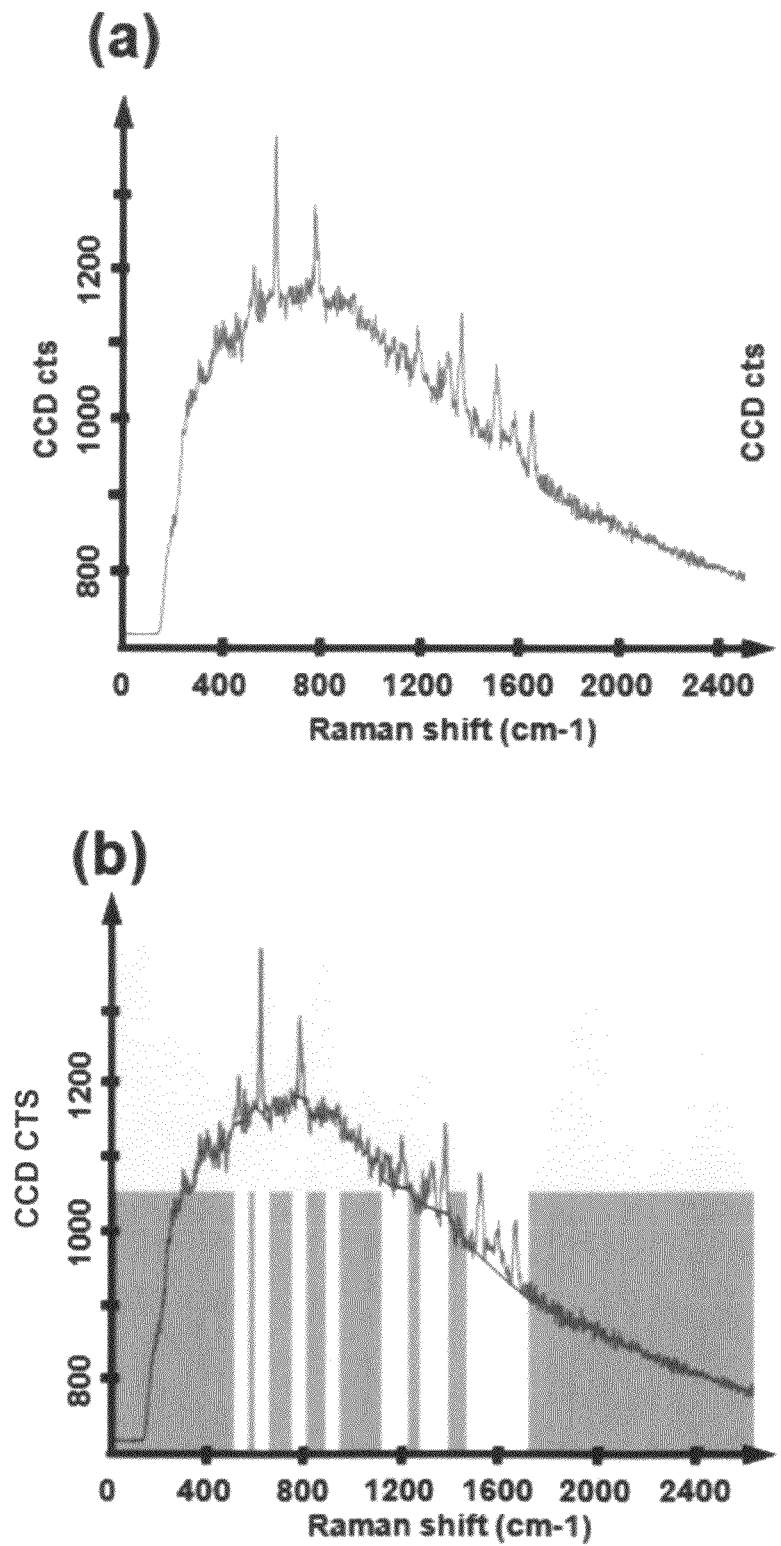
FIGS. 7a-7d show graphs of background extraction from whole SERS maps and calculation of signal intensity histograms, according to some embodiments of the invention.
Figure 7:
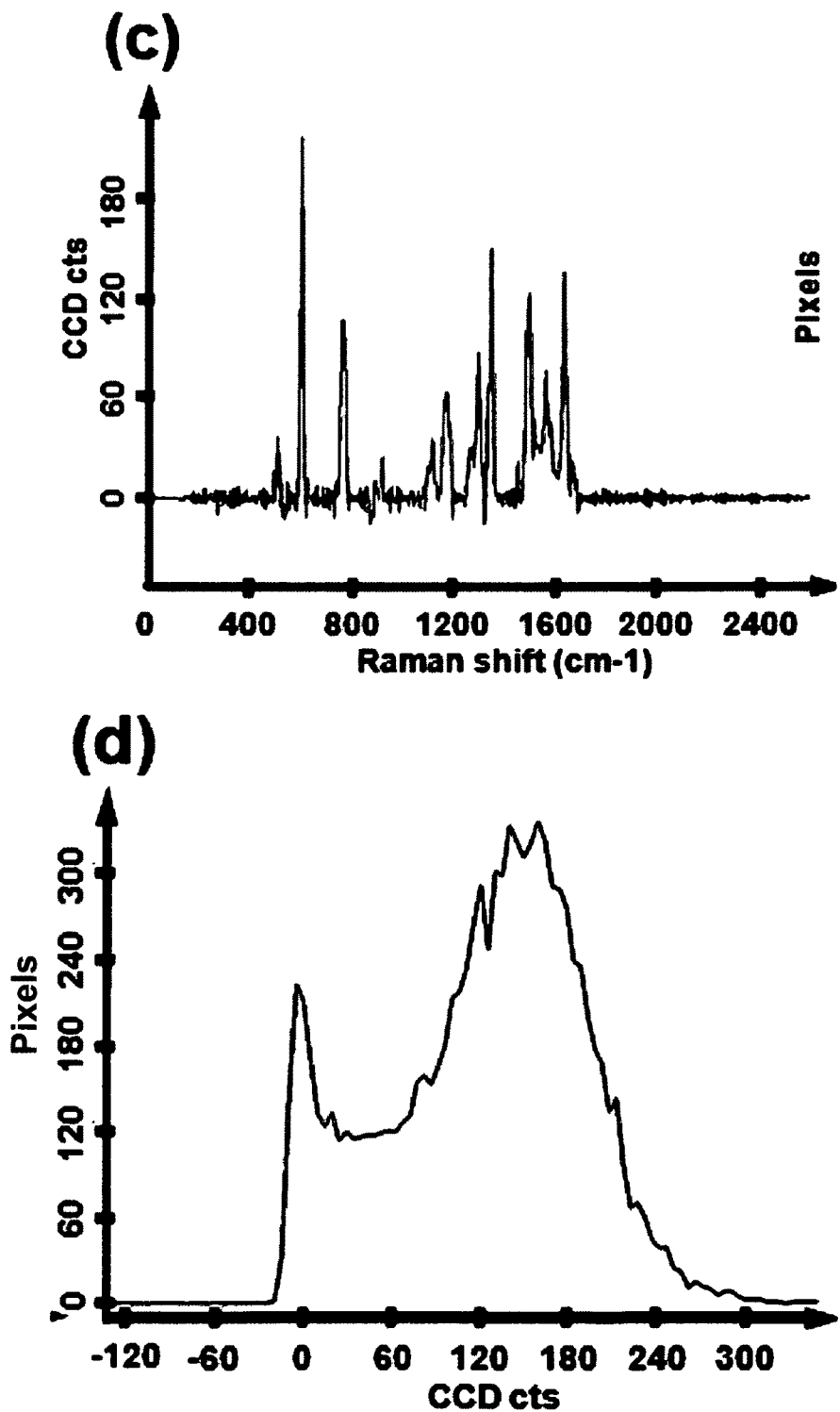
Figure 8:
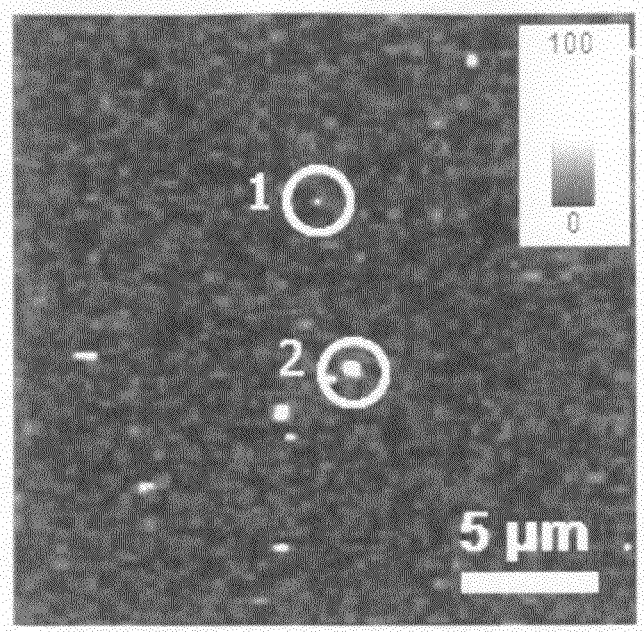
FIGS. 8a-8d show two-dimensional intensity maps of SERS signal and representative R6G Raman spectra from the two spots indicated in SERS maps, according to some embodiments of the invention.
Figure 8:
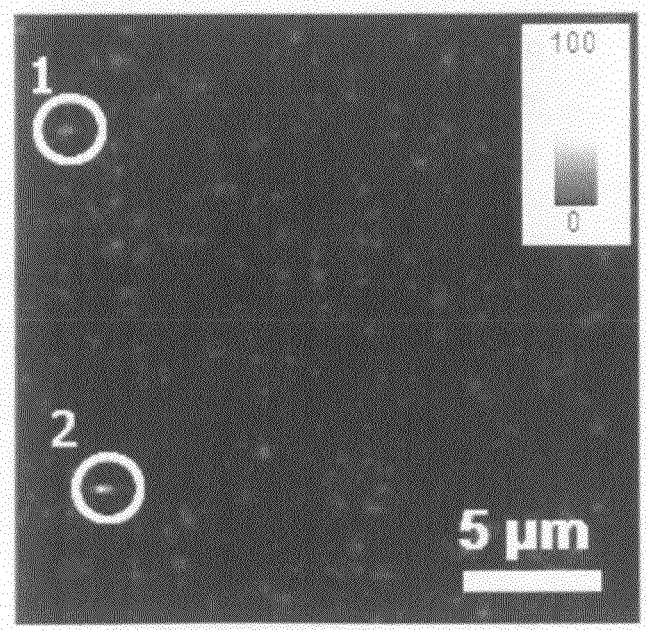
Figure 8:
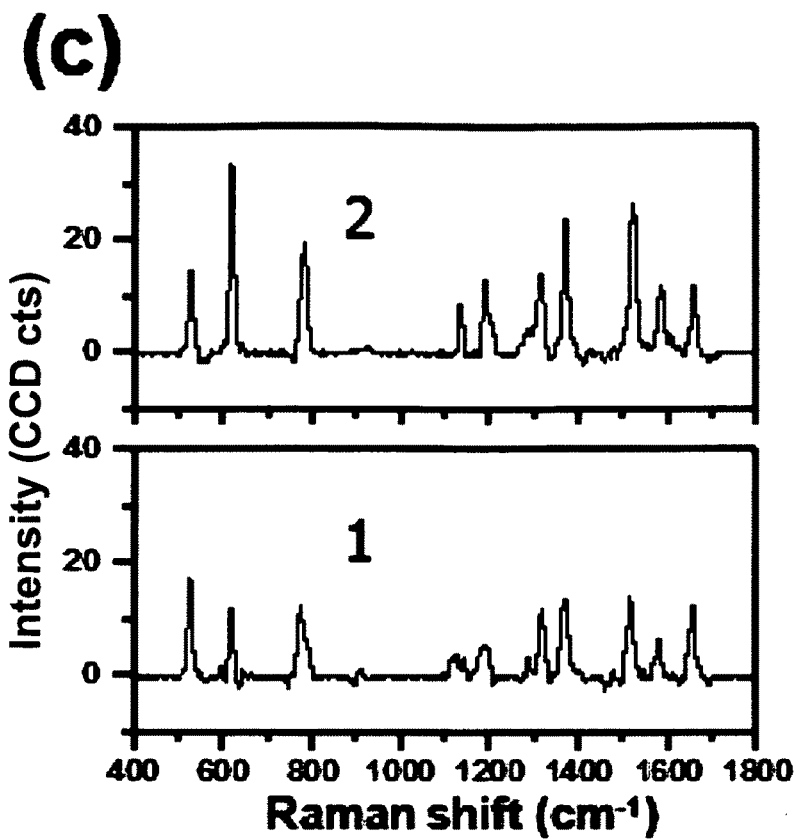
Figure 8:
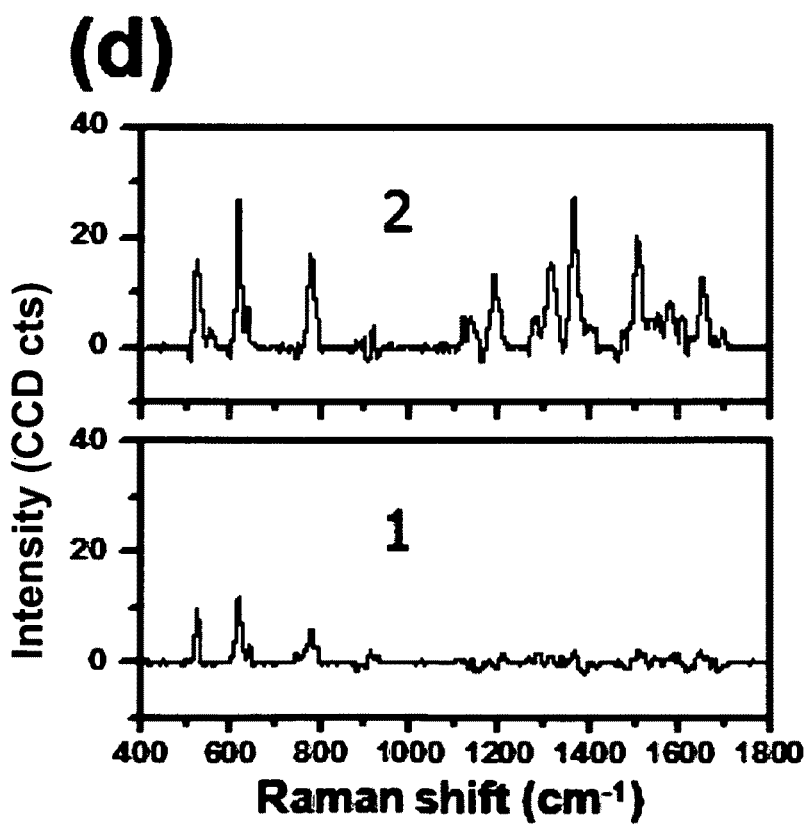

For plotting the graph in FIG. 3f, software of the confocal Raman system was used. Background extraction from whole SERS maps and calculation of signal intensity histograms, FIGS. 7a-7d, were carried out by the system software. FIG. 7a shows the as-obtained spectrum of R6G. FIG. 7b shows a calculated background level shown as a smooth line fitted by the average value of 5 neighboring pixels at every position, after masking several SERS peaks. FIG. 7c shows a background subtracted SERS spectrum of R6G, and FIG. 7d shows an intensity histogram of the 615 cm$^{-1}$ peak. To calculate the average and standard deviation of signal intensity, the 1000 brightest pixels were selected from the intensity histogram for excluding signals from vacant Si regions, which are devoid of nanoparticles, and their boundaries.

At the concentration of $10^{-9}$ M, which corresponds to an average of 4 molecules per single Raman sombrero nanoparticle, the bright contrast from closely packed regions (FIG. 3d) and the characteristic Raman peaks of R6G (FIG. 3e) are still clearly observed. This means that a few R6G molecules can be detected for a single Raman sombrero nanoparticle. Consistent with this "few molecule" detection capability, the sample of FIG. 3d produced time dependent on/off blinking Raman signals, as is common for "few molecule" systems. FIG. 3g shows temporal changes of Raman intensity from R6G over 25 sec intervals. As compared to the nearly constant Si signal, the temporal profiles of the R6G intensity show several spikes which almost certainly originate from single molecule Raman scattering. To illustrate this, SERS spectra at selected time points, indicated as dashed lines in FIG. 3g, are presented in FIG. 3h. Spectra numbers 3, 5, 6 and 8 show a clear R6G Raman signal. The average time duration of strong scattering is about 220 msec. Furthermore, SERS maps of the sample treated with more dilute R6G solutions were examined and Raman signals were detected at some locations even at 1 pM, which corresponds to 1 molecule/10 µm². FIGS. 8a-8d show two-dimensional intensity maps of SERS signals, integrated between 590 and 640 cm$^{-1}$, from the Ag Raman sombrero nanoparticle array treated with R6G concentrations of (8a) 1E-10 M and (8b) 1E-12 M. (8c) and (8d) show representative R6G Raman spectra from the two spots indicated in SERS maps of (8a) and (8b), respectively. Baseline signals are corrected as before. This extreme sensitivity of detecting Raman signals from 1 pM treatment and the blinking behavior in FIGS. 3g-3h demonstrate that these signals arise from a single molecule on single nanoparticle, even though the method used for R6G surface treatment cannot guarantee uniform molecular coverage. The enhancement factor of the Raman sombrero nanoparticle is estimated at about $2\times10^{10}$, as is discussed below, from the relative intensity of fluorescence and SERS (see FIG. 9), in agreement with the stated minimum required enhancement of $10^8$ for detecting single molecules under molecular resonance conditions.

Figure 10:
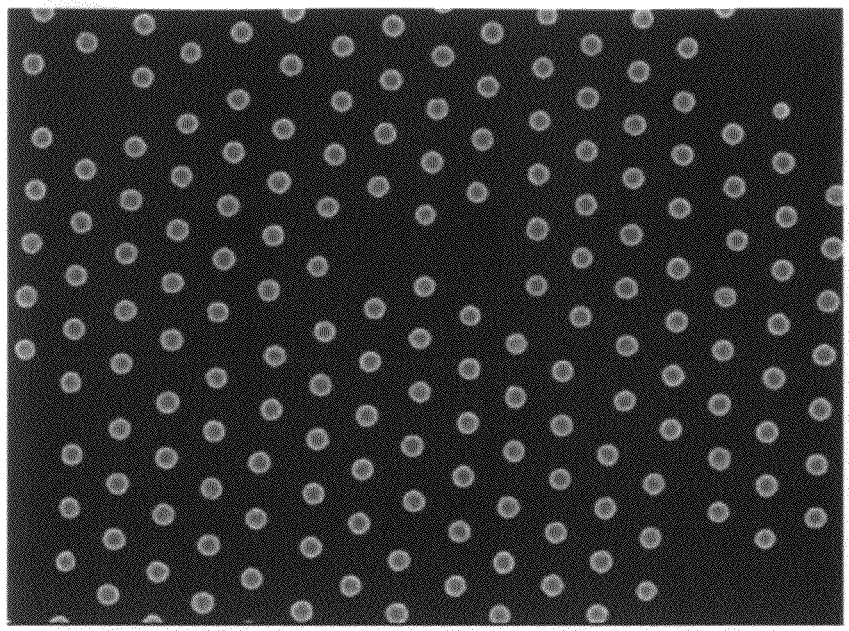
FIGS. 10a-10e show plan-view SEM images of Ag nano-disk array and 2-dimensional intensity maps of SERS signals, according to some embodiments of the invention.
Figure 10:
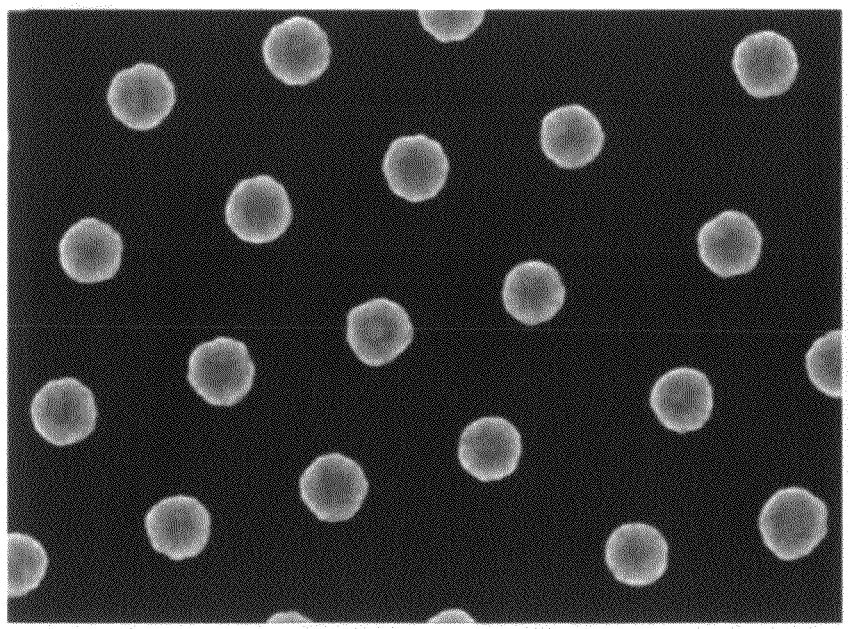
Figure 10:
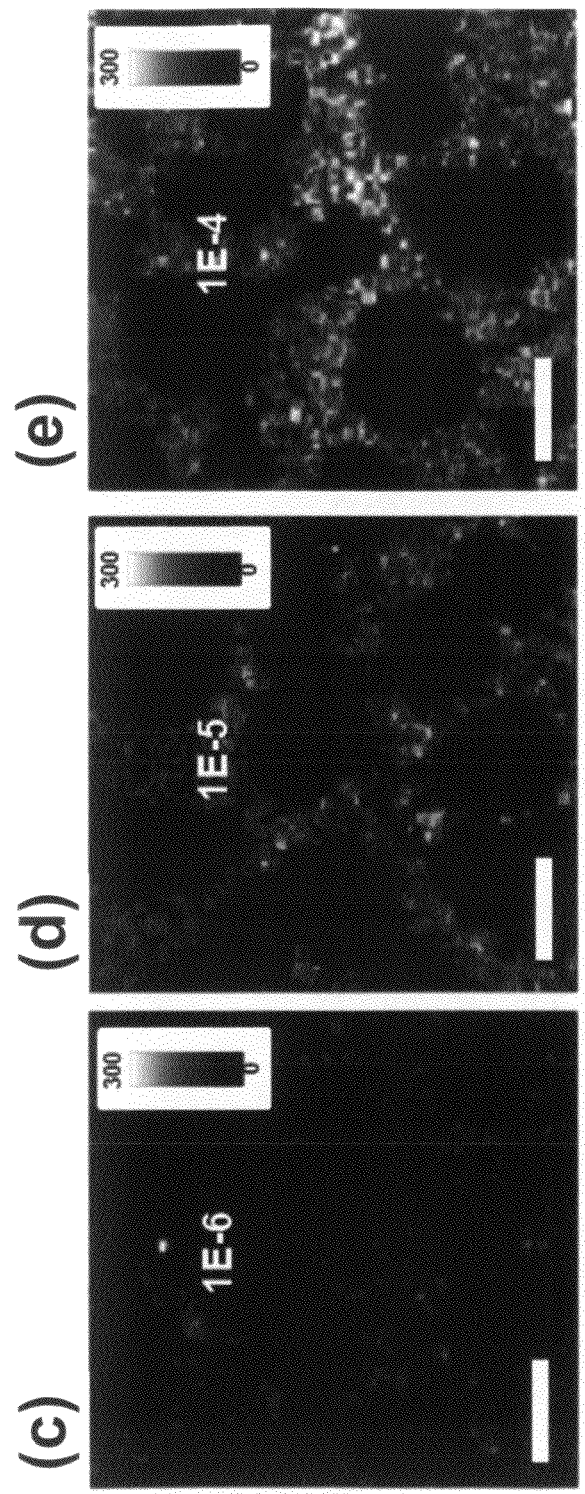

To isolate the effect of the unique shape of the Raman sombrero nanoparticle, Ag nano-disks were fabricated with the same NIL mold used for the sombrero nanoparticles, but without the sharp sombrero brims. To do so, Ag films were evaporated, rather than being ion beam deposited, without SiO$_2$ bases and it was found that the resulting nanoparticles have smooth edge profiles, as shown in FIGS. 10a-10b. SERS maps for these Ag nano-disk arrays, also treated with the different concentrations of R6G, were obtained by identical procedures. FIGS. 10c-10e show 2-dimensional intensity maps of SERS signals, between 590 and 640 cm$^{-1}$, from the Ag nano-disk array with different concentrations of Rhodamine 6G; (10c) 1E-6 M, (10d) 1E-5M, and (10e) 1E-4M. The scale bar in (10c-10e) is 5 µm. As indicated by the square data points in FIG. 3f, the minimum detection level of R6G increased by three orders of magnitude, changing from a single molecule per Raman sombrero nanoparticle to a few thousand molecules per nano-disk. Concomitantly, the intensity of Raman signals at dye saturation levels was only about 20% of those for Raman sombreros. The reduced enhancement at saturating dye coverage is not surprising as many adsorbed dye molecules will not have access to hot spots. These results both support the notion that the circular perimeter of Raman sombrero nanoparticles functions as a Raman hot spot that increases the overall SERS intensity and enables single molecule detection.

Figure 4:
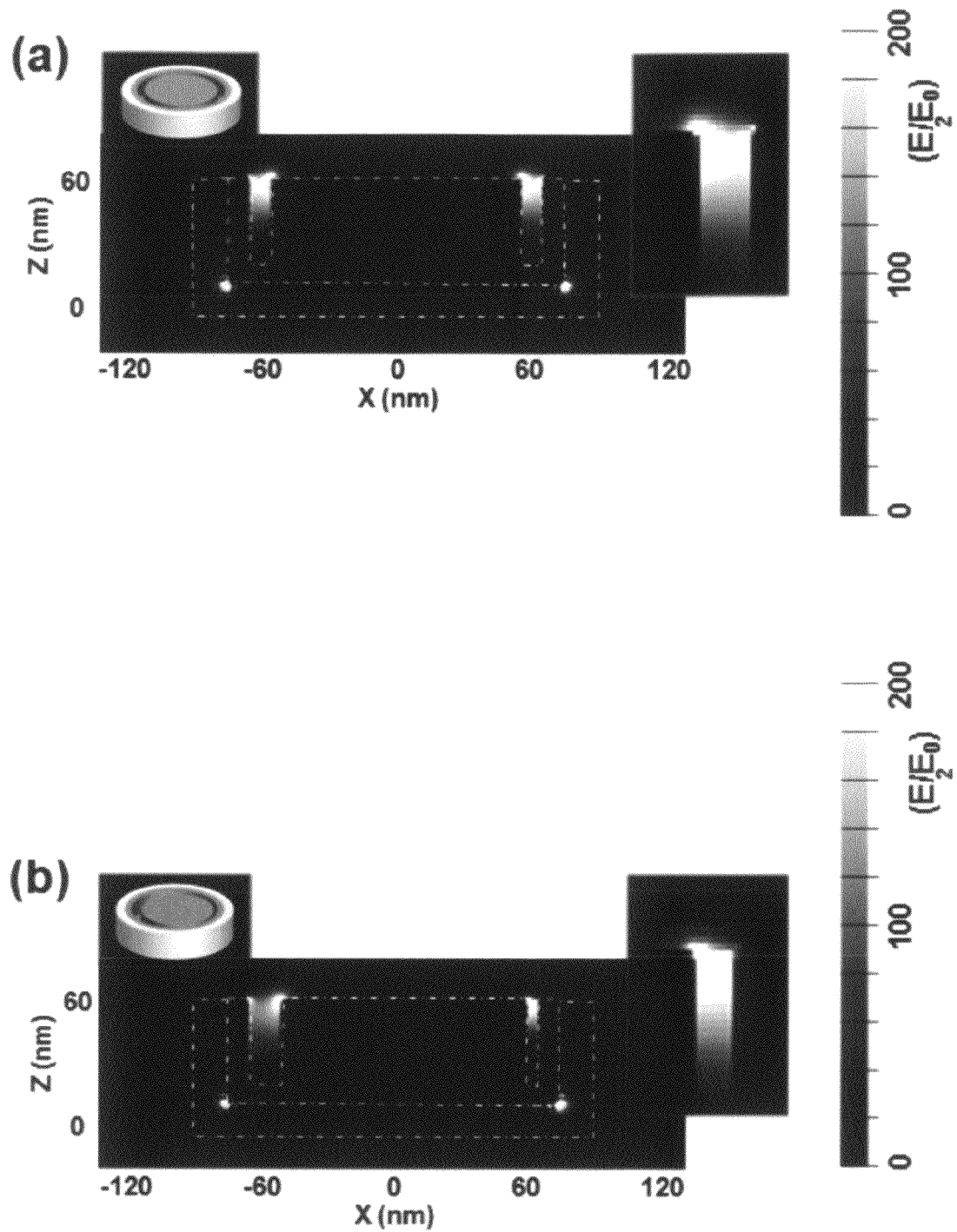
FIGS. 4a-4d show results of full-field electromagnetic simulations, according to some embodiments of the invention.
Figure 4:
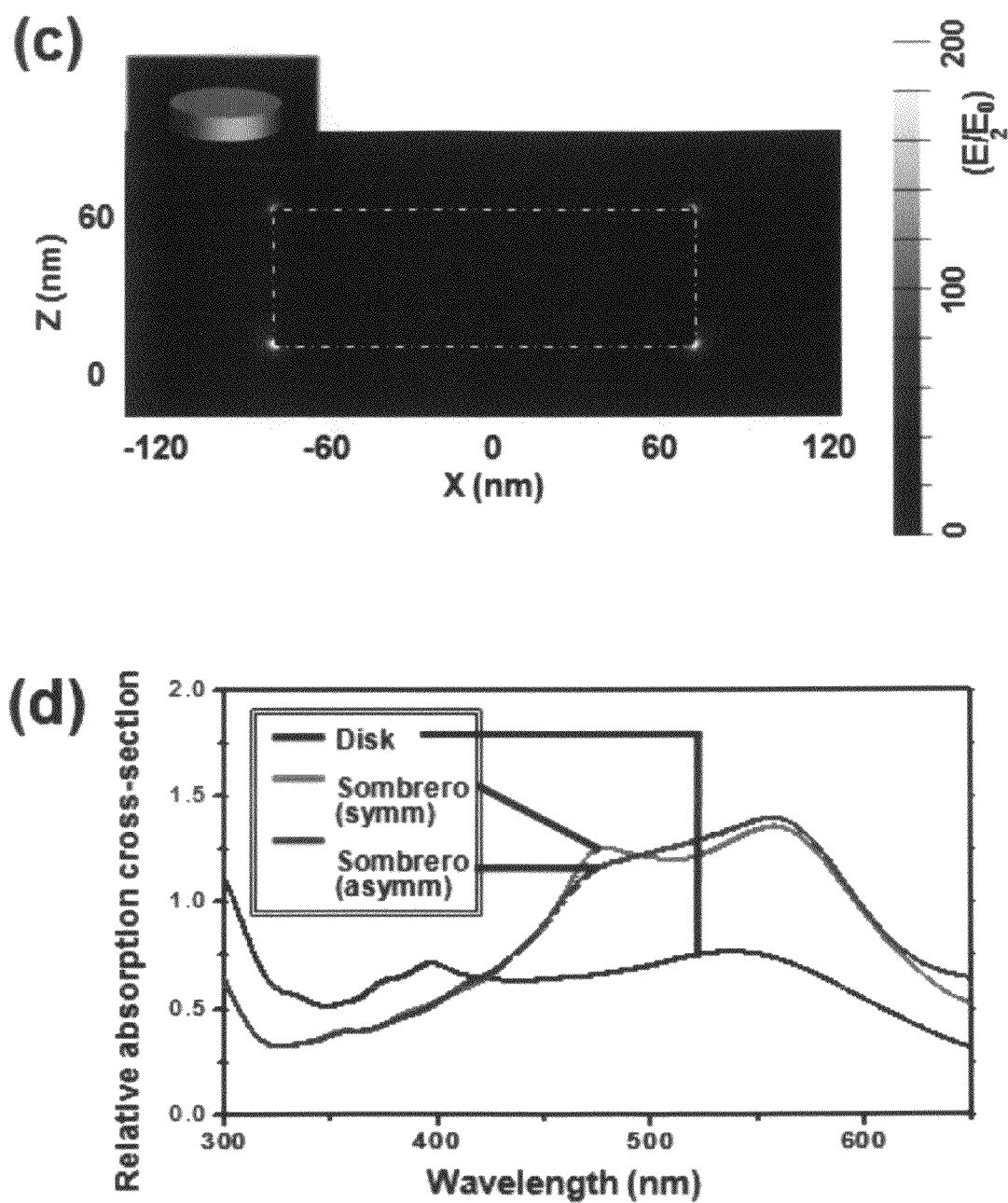
Figure 11:
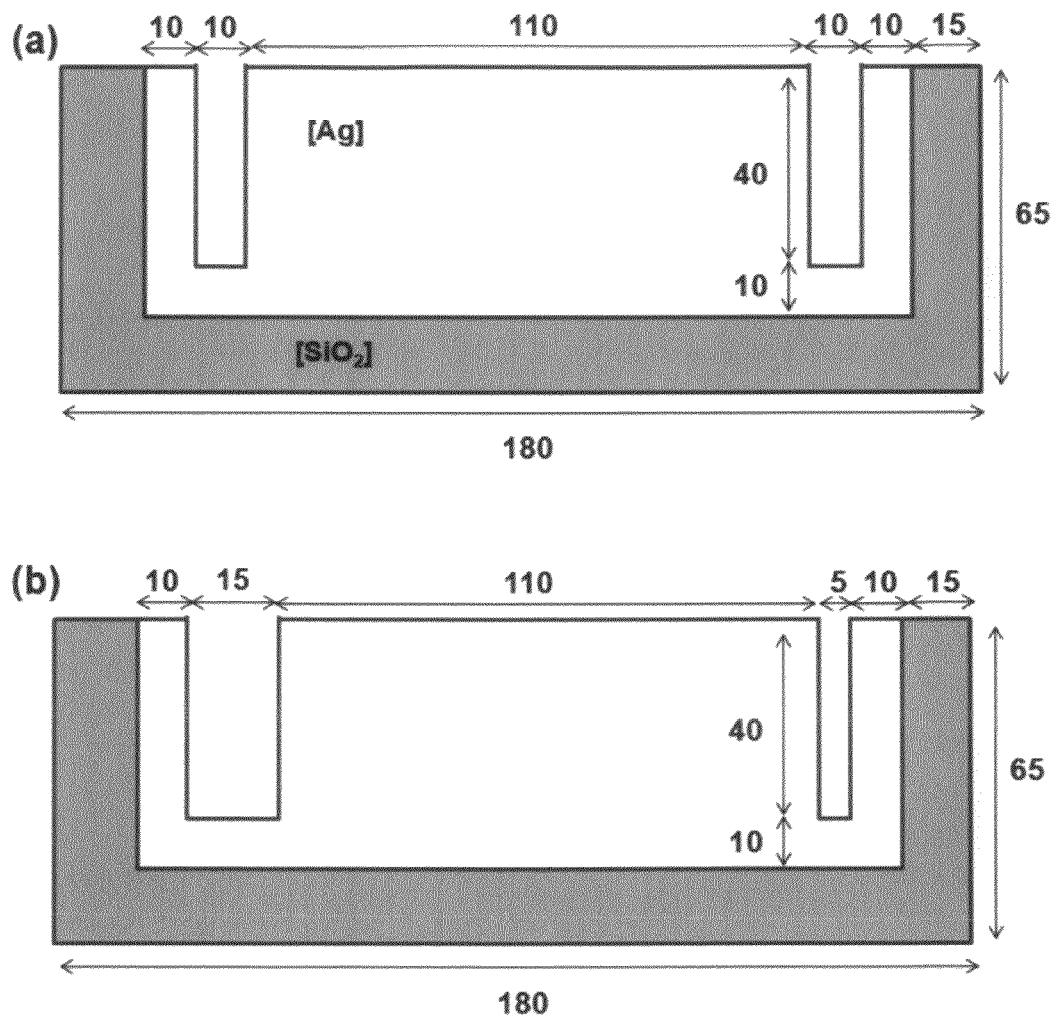
FIGS. 11a-11b show schematic cross section views of Raman sombrero nanoparticles with symmetric and asymmetric cores, according to some embodiments of the invention.
Figure 12:
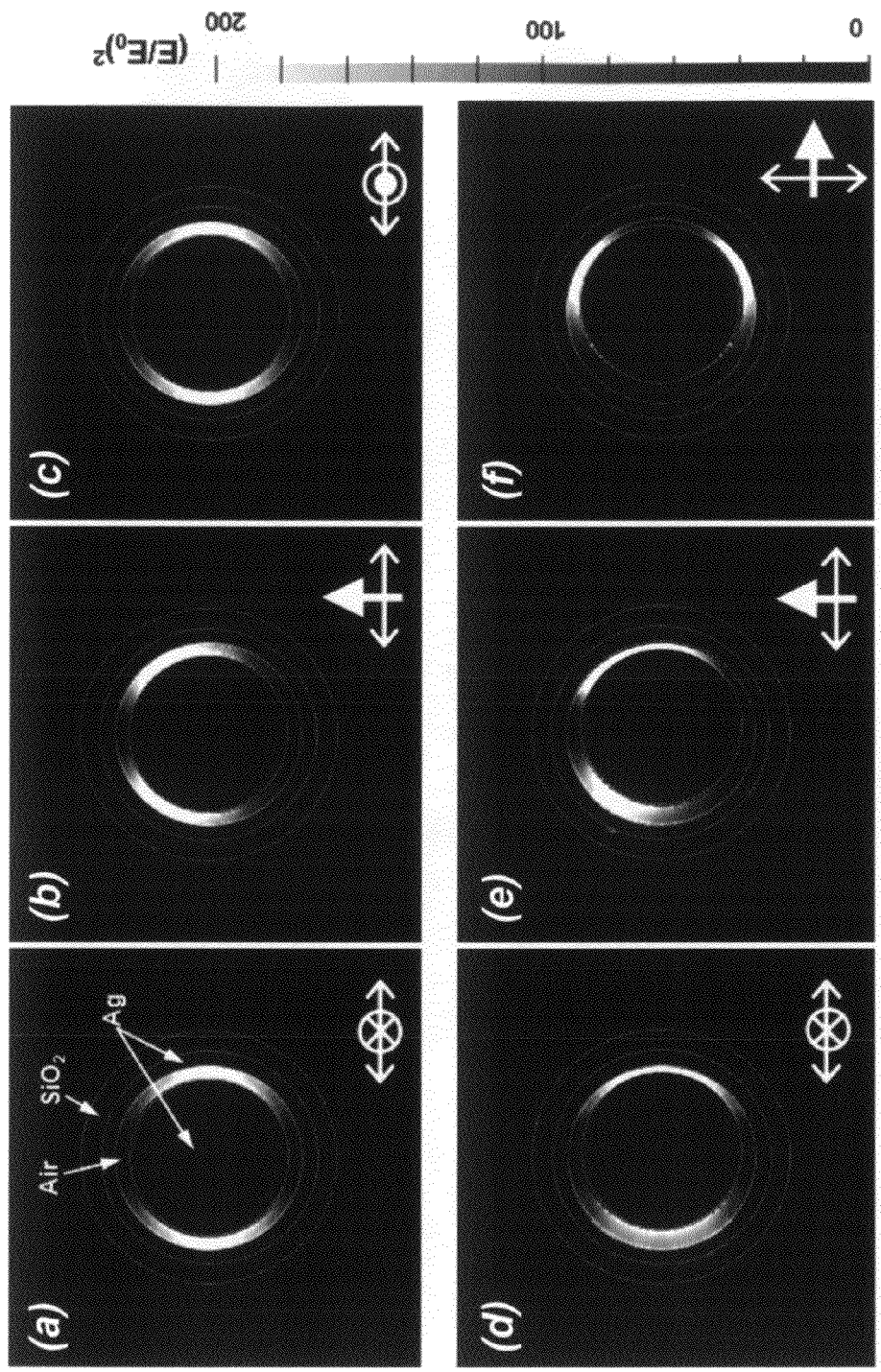
FIGS. 12a-12f show plan-views of local electrical field amplitudes of Raman sombrero nanoparticles with symmetric and asymmetric cores, according to some embodiments of the invention.

In order to understand the electromagnetic contributions to SERS enhancement, exemplary local electric field amplitudes of Ag nano-disks and Raman sombrero nanoparticles in air were modeled using three-dimensional finite-difference time-domain simulations. Nanoparticle shapes and dimensions are based on the SEM images in FIGS. 2a-2f, and details are provided in FIGS. 11a-11b, which show cross section and dimensions of a Raman sombrero nanoparticle with a (11a) symmetric core and (11b) asymmetric core. Units in the illustration are nm. The Ag nano-disk was drawn with 150 nm diameter and 50 nm height. The simulation placed particles in a uniform medium of air and illuminated from the top with a plane wave. The direction of incident light is from top to bottom with electric field polarized in the x-direction. The resulting contours of $|E/E_o|$, where $E_o$ and E represent the amplitude of the incident and enhanced electric field, respectively, are shown in FIGS. 4a-4c, for incident light of 530 nm wavelength. The brightness between the core and the sidewall of the Raman sombrero nanoparticle clearly shows the local electrical field enhancement in the gap. As presented in FIG. 4b, the off-center appearance of the Ag core offers a further local increase of peak local field enhancement. It is caused by a narrower gap and potentially introduces Fano-type resonances due to the broken symmetry. The simulation results also show that the maximum $E/E_o$ values for sombrero nanoparticles versus nano-disks stand in the ratio $(650/20)^{1/2} \approx 5.7$. These electric field values are obtained at least 5 nm away from sharp corners to avoid computational anomalies from non-physical singularities, which are not present in experiments. As previously discussed, the measured minimum detection level of R6G was enhanced by three orders of magnitude on Raman sombrero nanoparticles as compared to Ag nano-disks. This means there is one-thousand-fold difference in the peak value of $(E/E_o)^4$ between these nanoparticle types. Therefore, the relative $E/E_o$ ratio from the experimental comparison of relative enhancements is $1000^{1/4} \approx 5.6$, which is very similar to the simulated value of 5.7 from FIGS. 4b-4c. Note, this model used bulk dielectric properties of Ag and $SiO_2$ from Palik's handbook and did not explicitly include a granular morphology for Ag films in order to limit complexity and excessive adjustable parameters. However, the enhancements from continuous island films or the rough surface of a gapped nanostructure are not expected to reach the values observed for the Raman sombreros described here, implying that the sombrero structure provides significant enhancement.

FIG. 4d shows the calculated absorption cross-section of Ag nano-disks and Raman sombrero nanoparticles as a function of excitation wavelength. The Raman sombrero nanoparticles is predicted to absorb more of the incident light at a wavelength of 530 nm than do the nano-disks. From FIGS. 4a-4b, it is shown that a high field is created in the gap between the core and ring and this high field is associated with the efficient excitation of surface plasmons that also provides the increased absorption. In the sombrero structure the Raman hot spot is extended over a much larger area as compared to ultra-sharp junction structures. FIGS. 12a-12f show the plan-view of local electrical field amplitude of Raman sombrero nanoparticle with (12a-12c) symmetric and (12d-12f) asymmetric cores. The field contours are obtained 5 nm away from the top surface of nanoparticles. The direction of incident light and its polarization is indicated as a single and double headed arrow, respectively, at each inset. Based on these simulation results, the circular perimeter of sombrero nanoparticles is active as long as the light contains an electric field component which is parallel to the lateral dimension of the sombrero nanoparticle. Therefore, it is expected that the perimeter of sombrero nanoparticles can function as the Raman hot spot for a range of random orientations of suspended nanoparticles.

Referring again to FIG. 1j, also see FIG. 5c, magnetic multilayers 108 are incorporated into the Raman-active nanoparticles 101 to provide magneto-Raman multifunctional nanoparticles. The addition of a magnetic multifunctionality to this synthetic nanoparticle is desired, since chemically synthesized magnetic nanoparticles can be to useful in biology and medicine. If desirable magnetic properties are combined with the capabilities of our highly sensitive Raman-active nanoparticle, it becomes possible to both manipulate and sense nanoparticles, and possibly even treat cancer cells with external magnetic fields. For incorporating magnetic elements into the Raman sombrero nanoparticle, synthetic antiferromagnetic (SAF) films with the structure of Ti (5 nm)/Fe (10 nm)/Ti (3 nm)/Fe (10 nm)/Ti (5 nm) were evaporated at normal incidence before depositing the $SiO_2$ layer. The antiferromagnetic interaction and orientation of the two ferromagnetic Fe layers within each nanoparticle eliminate remanence, and consequent magnetic aggregation at zero magnetic field, while retaining high saturation magnetic moments. Other magnetic structures or materials, such as superparamagnets, can be similarly included.

FIG. 5a shows SAF nanoparticles after coating with a $SiO_2$ overlayer. As familiar from previous results in FIGS. 2a-2c, $SiO_2$ films are conformally deposited on the sidewall of PMGI and on the surface of SAF nanoparticle. The hysteresis loop in FIG. 5c is measured by alternating gradient magnetometry at room temperature for substrate-bound nanoparticles, and shows the low coercivity, remanence and the saturation field expected of the composite nanoparticles. Composite SAF/Raman sombrero nanoparticles, which were released from the sample surface, collected and dried on wafer surfaces, are shown in FIG. 5b. Because the diameter of the PMMA hole continually decreased during the deposition of SAF and $SiO_2$ layers, the Ag core indicated by the arrow in the inset of FIG. 5b is noticeably smaller than the SAF component at bottom. Although the thickness and size of the Raman component was not optimized, the Raman signal from composite nanoparticles, marked as a diamond-shaped data point in FIG. 3f, is not much different from those of Raman sombrero nanoparticles.

Figure 9:
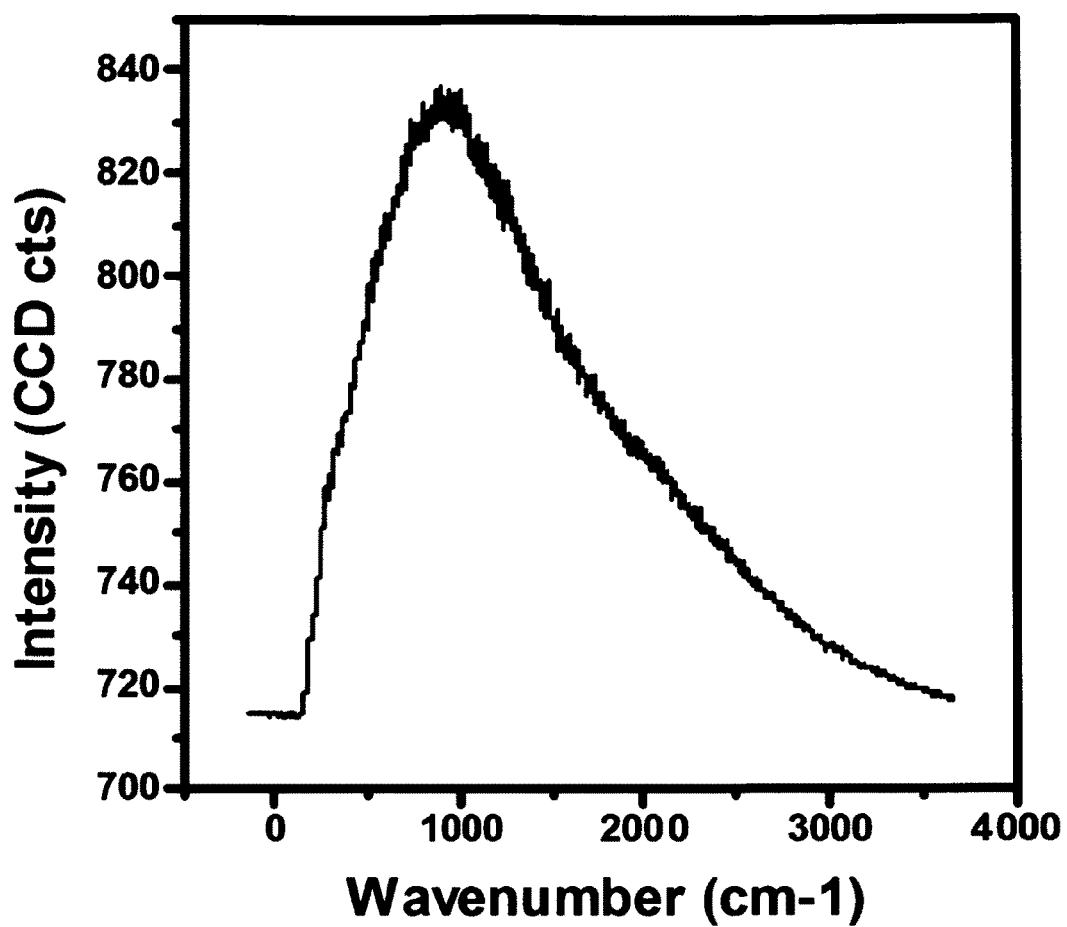
FIG. 9 shows a fluorescence signal of R6G, according to one embodiment of the invention.

Due to the huge fluorescence background of R6G at its resonance condition, it is difficult to measure the Raman intensity from a molecular R6G solution sample with our excitation source. So enhancement factors of the Raman sombrero nanoparticles are estimated from the relative intensity of fluorescence and SERS. FIG. 9 shows the fluorescence signal of R6G from the exact same laser configuration as the SERS measurement (532 nm laser, 1.4 mW, 100× objective lens, and accumulation time of 0.036 sec). 10 ul of 1E-5 M R6G aqueous solution was contained between two 12 mm diameter cover glasses. Because of the surface tension of the water, a thin uniform liquid layer between two cover glasses was generated without overflow. Assuming that the excitation volume is a cylinder, the diameter of the laser beam (r≈360 nm) was calculated from the wavelength and numerical aperture of the objective lens, and the height (h≈88 μm) was calculated from the volume of the R6G solution and diameter of cover glass. From the fluorescence signal (~120 CCD cts, where cts (counts) is defined to mean the digital output of the CCD) shown in FIG. 9 and the number of R6G molecules (~5.4×10$^4$) in the calculated excitation volume, the fluorescence intensity is about $2.2 \times 10^{-3}$ CCD cts/molecule. As indicated in the FIG. 3f, Raman signal from 4 molecules on Raman sombrero nanoparticles is about 30 CCD cts. Therefore the estimated SERS enhancement factor is about $2.1 \times 10^{10}$, considering the relative ratio of the cross section of Raman scattering ($4.1 \times 10^{-23}$ cm$^2$) and fluorescence ($2.6 \times 10^{-16}$ cm$^2$) of R6G. The enhancement factor (EF) was calculated using the following equation.

$$EF = \frac{(SERS \text{ intensity})/(\text{Molecules on } Raman \text{ sombrero})}{(\text{Fluorescence intensity})/(\text{Molecules in solution})} \times \frac{(\text{Cross section of fluorescence})}{(\text{Cross section of } Raman \text{ scattering})}$$

The invention provides a device and method that includes a highly reliable and cost-effective synthetic approach for fabricating sub-lithographic feature enhanced Raman-active nanoparticles. Precisely controlled dimensions and unique internal structure of Ag-based Raman sombrero nanoparticles enable detection of single R6G molecules. The highly improved sensitivity of the nanoparticle is based on a 1000 fold increase of maximal SERS enhancement factors by the circular nano-gap, which is confirmed by experimental comparison with Ag nano-disk arrays and their simulated electric field amplitudes. Furthermore, because the proposed method uses nanoimprint and vacuum deposition methods which are suitable for mass production, exquisite and affordable control of such nanoparticle structures is expected to become routine. Although the exemplary Raman sombrero nanoparticles were designed for resonance at our 532 nm laser wavelength, it is understood that the methods and device of the invention can be broadly applied to designs for other wavelengths and dielectric media, and preliminary results for Raman sombreros using Au and a near IR dye do appear promising. The present results show that Raman sombrero nanoparticles can be used as an ultrasensitive molecular detection platform and that released nanoparticles that contain magnetic elements, distinguishable through the use of different Raman dyes for nanoparticle or analyte identification, can be useful as multi-functional in-vitro or in-vivo imaging reagents.

The present invention has now been described in accordance with several exemplary embodiments, which are intended to be illustrative in all aspects, rather than restrictive. Thus, the present invention is capable of many variations in detailed implementation, which may be derived from the description contained herein by a person of ordinary skill in the art. For one example, such nanoparticles could be coated with antibodies and used in a sandwich assay where the detection antibody is conjugated to a resonant Raman dye.

In this case, completion of the antibody-antigen-antibody will lead to enhancement of bound detection antibody Raman scattering. This Raman scattering from the Raman label is distinguishably enhanced over the Raman scattering of antibodies, or other proteins which might provide similar vibrational signatures, by virtue of the Raman dye resonance with the excitation source. As a second example, we note the dielectric base has been used for mechanical support here but might be fabricated using only the thin metal film if an appropriate metal or dimensional adjustment allows. A third example is that the need for sample rotation and source tilting can be eliminated, in some cases, by adopting alternative deposition methods.

All such variations are considered to be within the scope and spirit of the present invention as defined by the following claims and their legal equivalents.

What is claimed:

1. A Raman-active nanoparticle comprising:
   a. a circular base and a parallel-surface wall surrounding said circular base, wherein said circular base is a plasmonically active metal circular base; and
   b. a plasmonically active metal circular pillar disposed on said plasmonically active metal circular base, wherein said plasmonically active metal circular pillar is disposed within said parallel-surface wall of said plasmonically active metal circular base and normal to a bottom of said plasmonically active metal circular base, wherein a circular gap is disposed between a side of said active metal circular pillar and an inner surface of said parallel-surface wall of said plasmonically active metal circular base.

2. The Raman-active nanoparticle of claim 1, wherein said plasmonically active metal circular base comprises a material selected from the group consisting of Ag, Au, Pt, Cu, and Al.

3. The Raman-active nanoparticle of claim 1, wherein said plasmonically active metal circular base comprises layered laminates and alloys.

4. The Raman-active nanoparticle of claim 1, wherein said plasmonically active metal circular pillar comprises material selected from the group consisting of Ag, Au, Pt, Cu, and Al.

5. The Raman-active nanoparticle of claim 4, wherein said plasmonically active metal circular pillar comprises layered laminates and alloys.

6. The Raman-active nanoparticle of claim 1, wherein said circular gap has a dimension in a range of 1 nm to 100 nm.

7. The Raman-active nanoparticle of claim 1, wherein said plasmonically active metal circular base is disposed on a dielectric material, wherein said dielectric material comprises a circular dielectric base and a parallel-surface dielectric wall surrounding said circular dielectric base.

8. The Raman-active nanoparticle of claim 7, wherein said dielectric material comprises a material selected from the group consisting of $SiO_2$, $Al_2O_3$, MgO, silicon nitride, titanium nitride, and indium tin oxide.

9. The Raman-active nanoparticle of claim 7, wherein said dielectric parallel-surface wall has an outer diameter in a range of 10 nm to 1000 nm.

10. The Raman-active nanoparticle of claim 7, wherein said dielectric parallel-surface wall has a wall thickness in a range of 1 nm to 100 nm.

11. The Raman-active nanoparticle of claim 7, wherein said dielectric circular base dielectric material has a bottom thickness in a range of 1 nm to 100 nm.

12. The Raman-active nanoparticle of claim 7, wherein said dielectric parallel-surface wall dielectric material has a height in a range of 2 nm to 100 nm.

13. The Raman-active nanoparticle of claim 7, wherein said dielectric material comprises a material having a complex index of refraction (n+ik), wherein k has a value in a range between 0.0 and 0.5.

14. The Raman-active nanoparticle of claim 1, wherein said plasmonically active metal circular base has a thickness in a range of 1 nm to 100 nm.

15. The Raman-active nanoparticle of claim 1, wherein said plasmonically active metal circular pillar has a diameter in a range of 1 nm to 999 nm.

16. The Raman-active nanoparticle of claim 1, wherein said plasmonically active metal circular pillar has a height in a range of 1 nm to 200 nm.

17. The Raman-active nanoparticle of claim 1, wherein said nanoparticle comprises of at least one magnetic layer.

18. The Raman-active nanoparticle of claim 1, wherein said nanoparticle comprises at least one magnetic coating.

19. The Raman-active nanoparticle of claim 1, wherein said Raman-active nanoparticle comprises an array of said Raman-active nanoparticles on a substrate.

* * * * *